US010504349B2

(12) United States Patent
Benson et al.

(10) Patent No.: US 10,504,349 B2
(45) Date of Patent: *Dec. 10, 2019

(54) TRUSTED MONITORING SYSTEM AND METHOD

(71) Applicant: 1997 Irrevocable Trust for Gregory P. Benson, Del Mar, CA (US)

(72) Inventors: Greg Benson, Rancho Santa Fe, CA (US); Matthew Anthony Fistonich, San Diego, CA (US)

(73) Assignee: 1997 Irrevocable Trust for Gregory P. Benson, Rancho Santa Fe, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/287,464

(22) Filed: Oct. 6, 2016

(65) Prior Publication Data
US 2017/0024988 A1 Jan. 26, 2017

Related U.S. Application Data

(63) Continuation of application No. 14/480,362, filed on Sep. 8, 2014, now abandoned, which is a continuation
(Continued)

(51) Int. Cl.
G08B 13/00 (2006.01)
G08B 13/22 (2006.01)
(Continued)

(52) U.S. Cl.
CPC ......... *G08B 13/22* (2013.01); *G05B 13/0275* (2013.01); *G06F 11/202* (2013.01);
(Continued)

(58) Field of Classification Search
CPC ........ G08B 13/22; G08B 21/12; G08B 29/16; G08B 21/02; G08B 13/196;
(Continued)

(56) References Cited

U.S. PATENT DOCUMENTS 4,636,634 A 1/1987 Harper
5,068,798 A 11/1991 Heath et al.
(Continued)

FOREIGN PATENT DOCUMENTS

WO WO 00/65770 11/2000
WO WO 01/27794 4/2001
WO WO 01/63994 8/2001

OTHER PUBLICATIONS

Cremer, Polarimetric infrared and sensor fusion for the detection of landmines, Thesis, TNO Physics and Electronics Laboratory, The Hague, The Netherlands, 2003, pp. 1-241.
(Continued)

*Primary Examiner* — Anh V La
(74) *Attorney, Agent, or Firm* — Knobbe, Martens, Olson & Bear, LLP

(57) ABSTRACT

Methods and apparatus for monitoring remotely located objects with a system including at least one master data collection unit, remote sensor units, and a central data collection server are described. The master unit is configured to monitor any object, mobile or stationary, including monitoring multiple remote sensor units associated with the monitored objects. The master unit may be in a fixed location or attached to a mobile object. The master unit is configured for monitoring objects that enter and leave an area. The master unit may act as a parent controller for one or more child devices including remote sensors or monitors of measurable conditions including environmental conditions, substance identification, product identification, and/or biometric identification. The master unit may discover remote sensor units as they enter or leave the area where the master unit is located. The master unit can be remotely reprogrammed such as with authenticated instructions.

20 Claims, 14 Drawing Sheets

Related U.S. Application Data of application No. 13/724,942, filed on Dec. 21, 2012, now Pat. No. 8,830,053, which is a continuation of application No. 12/641,139, filed on Dec. 17, 2009, now abandoned, which is a continuation of application No. 11/418,380, filed on May 3, 2006, now Pat. No. 7,656,286.

(60) Provisional application No. 60/735,539, filed on Nov. 10, 2005, provisional application No. 60/677,164, filed on May 3, 2005.

(51) Int. Cl.

| | |
|---|---|
| G06N 20/00 | (2019.01) |
| G05B 13/02 | (2006.01) |
| G06N 5/04 | (2006.01) |
| G06Q 10/08 | (2012.01) |
| G06Q 30/02 | (2012.01) |
| G06Q 50/26 | (2012.01) |
| G06Q 50/28 | (2012.01) |
| G06Q 50/30 | (2012.01) |
| G07C 5/00 | (2006.01) |
| G07C 5/08 | (2006.01) |
| G07C 9/00 | (2006.01) |
| G07F 7/06 | (2006.01) |
| G07G 1/00 | (2006.01) |
| G07G 3/00 | (2006.01) |
| G08B 13/196 | (2006.01) |
| G08B 13/24 | (2006.01) |
| G08B 21/02 | (2006.01) |
| G08B 21/12 | (2006.01) |
| G08B 25/14 | (2006.01) |
| G08B 29/16 | (2006.01) |
| H04K 3/00 | (2006.01) |
| H04L 9/32 | (2006.01) |
| H04L 29/06 | (2006.01) |
| H04N 7/18 | (2006.01) |
| H04L 29/08 | (2006.01) |
| G06F 21/52 | (2013.01) |
| G06N 7/00 | (2006.01) |
| G06F 11/20 | (2006.01) |
| G08B 29/04 | (2006.01) |

(52) U.S. Cl.
CPC .............. *G06F 21/52* (2013.01); *G06N 5/048* (2013.01); *G06N 7/005* (2013.01); *G06N 20/00* (2019.01); *G06Q 10/08* (2013.01); *G06Q 10/0833* (2013.01); *G06Q 30/02* (2013.01); *G06Q 50/26* (2013.01); *G06Q 50/28* (2013.01); *G06Q 50/30* (2013.01); *G07C 5/008* (2013.01); *G07C 5/085* (2013.01); *G07C 9/00087* (2013.01); *G07F 7/0636* (2013.01); *G07G 1/0036* (2013.01); *G07G 3/00* (2013.01); *G08B 13/196* (2013.01); *G08B 13/2454* (2013.01); *G08B 21/02* (2013.01); *G08B 21/12* (2013.01); *G08B 25/14* (2013.01); *G08B 29/16* (2013.01); *H04K 3/22* (2013.01); *H04L 9/3236* (2013.01); *H04L 9/3247* (2013.01); *H04L 63/0428* (2013.01); *H04L 63/10* (2013.01); *H04L 63/101* (2013.01); *H04L 67/025* (2013.01); *H04L 67/12* (2013.01); *H04L 67/18* (2013.01); *H04L 67/22* (2013.01); *H04N 7/181* (2013.01); *G06F 2221/034* (2013.01); *G07C 5/0891* (2013.01); *G07C 9/00158* (2013.01); *G07C 2009/0092* (2013.01); *G08B 29/04* (2013.01); *H04L 2209/805* (2013.01)

(58) Field of Classification Search
CPC .... G08B 13/2454; G08B 25/14; G08B 29/04; H04L 63/101; H04L 67/18; H04L 67/12; H04L 67/025; H04L 67/22; H04L 63/10; H04L 63/0428; H04L 9/3247; H04L 9/3236; H04L 2209/805; G06Q 10/0833; G06Q 10/08; G06Q 30/02; G06Q 50/26; G06Q 50/28; G06Q 50/30; G06N 7/005; G06N 5/048; G06N 99/005; G06N 20/00; G06F 21/52; G06F 2221/034; G06F 11/02; H04N 7/181; H04K 3/22; G05B 13/0275; G07G 3/00; G07G 1/0036; G07F 7/0636; G07C 9/00087; G07C 5/085; G07C 5/008; G07C 5/0891; G07C 9/00158; G07C 2009/0092

USPC ............... 340/541, 506, 521, 539.1, 539.26
See application file for complete search history.

(56) References Cited

U.S. PATENT DOCUMENTS

| | | |
|---|---|---|
| 5,078,952 A | 1/1992 | Gozani |
| 5,199,672 A | 4/1993 | King et al. |
| 5,219,194 A | 6/1993 | Trent |
| 5,280,527 A | 1/1994 | Gullman et al. |
| 5,345,809 A | 9/1994 | Corrigan |
| 5,377,906 A | 1/1995 | Mason |
| 5,416,706 A | 5/1995 | Hagenbuch |
| 5,528,228 A | 6/1996 | Wilk |
| 5,629,498 A | 5/1997 | Pollock |
| 5,644,489 A | 7/1997 | Hagenbuch |
| 5,696,884 A | 12/1997 | Heckerman et al. |
| 5,774,876 A | 6/1998 | Woolley |
| 5,905,443 A | 5/1999 | Olds et al. |
| 5,917,433 A | 6/1999 | Keillor et al. |
| 5,963,131 A | 10/1999 | D'Angelo et al. |
| 6,070,143 A | 5/2000 | Barney et al. |
| 6,204,764 B1 | 3/2001 | Maloney |
| 6,239,698 B1 | 5/2001 | Porter et al. |
| 6,248,063 B1 | 6/2001 | Barnhill et al. |
| 6,281,797 B1 | 8/2001 | Forster |
| 6,370,222 B1 | 4/2002 | Cornick |
| 6,398,727 B1 | 6/2002 | Bui et al. |
| 6,448,898 B1 | 9/2002 | Kasik |
| 6,483,434 B1 | 11/2002 | Umiker |
| 6,560,592 B1 | 5/2003 | Reid et al. |
| 6,594,578 B2 | 7/2003 | Lai |
| 6,613,571 B2 | 9/2003 | Cordery |
| 6,669,631 B2 | 12/2003 | Norris et al. |
| 6,707,381 B1 | 3/2004 | Maloney |
| 6,763,299 B2 | 7/2004 | Jones |
| 6,765,490 B2 | 7/2004 | Lopez et al. |
| 6,768,421 B1 | 7/2004 | Alioto |
| 6,782,302 B1 | 8/2004 | Barto et al. |
| 6,801,819 B1 | 10/2004 | Barto et al. |
| 6,919,803 B2 | 7/2005 | Breed |
| 6,988,279 B1 | 1/2006 | Kanevsky |
| 7,019,640 B2 * | 3/2006 | Canich ............... G06Q 10/08 340/531 |
| 7,032,816 B2 | 4/2006 | Markham et al. |
| 7,046,138 B2 | 5/2006 | Webb |
| 7,126,473 B1 | 10/2006 | Powell |
| 7,218,974 B2 | 5/2007 | Rumi et al. |
| 7,225,031 B2 * | 5/2007 | Feliss .................. A61B 5/0024 128/903 |
| 7,334,130 B2 | 2/2008 | Bowers |
| 7,353,532 B2 | 4/2008 | Duri et al. |
| 7,656,286 B2 * | 2/2010 | Benson ............ G05B 13/0275 340/508 |
| 8,830,053 B2 * | 9/2014 | Benson ............ G05B 13/0275 340/506 |

(56) References Cited

U.S. PATENT DOCUMENTS

| | | |
|---|---|---|
| 2002/0017977 A1 | 2/2002 | Wall |
| 2002/0017989 A1 | 2/2002 | Forster et al. |
| 2002/0083022 A1 | 6/2002 | Algazi |
| 2002/0083067 A1 | 6/2002 | Tamayo et al. |
| 2002/0120864 A1 | 8/2002 | Wu et al. |
| 2002/0124664 A1 | 9/2002 | Call |
| 2002/0138017 A1 | 9/2002 | Bui et al. |
| 2002/0152185 A1 | 10/2002 | Satish |
| 2003/0056113 A1 | 3/2003 | Korosec |
| 2003/0227392 A1 | 12/2003 | Ebert |
| 2004/0006398 A1 | 1/2004 | Bickford |
| 2004/0026491 A1 | 2/2004 | Beckert |
| 2004/0260666 A1 | 2/2004 | Pestotnik et al. |
| 2004/0041706 A1 | 3/2004 | Stratmoen et al. |
| 2004/0066887 A1 | 4/2004 | Garfinkle |
| 2004/0122703 A1 | 6/2004 | Walker et al. |
| 2004/0122709 A1 | 6/2004 | Avinash et al. |
| 2004/0174259 A1 | 9/2004 | Peel et al. |
| 2004/0196182 A1 | 10/2004 | Unnold |
| 2004/0233055 A1 | 11/2004 | Canich |
| 2004/0257223 A1 | 12/2004 | Webb et al. |
| 2005/0075899 A1* | 4/2005 | Corcoran ............... G06Q 10/08 705/331 |
| 2005/0248456 A1* | 11/2005 | Britton, Jr. ............ G06Q 10/08 340/539.29 |
| 2005/0261934 A1 | 11/2005 | Thompson |
| 2006/0071786 A1* | 4/2006 | Fano ..................... G08B 25/10 340/539.22 |
| 2006/0080316 A1 | 4/2006 | Gilmore et al. |
| 2006/0152355 A1* | 7/2006 | Suenbuel ............... G08B 21/12 340/511 |
| 2006/0291657 A1 | 12/2006 | Benson et al. |
| 2007/0002139 A1 | 1/2007 | Benson et al. |
| 2007/0008410 A1 | 1/2007 | Benson et al. |
| 2007/0011107 A1 | 1/2007 | Benson et al. |
| 2007/0011108 A1 | 1/2007 | Benson et al. |
| 2007/0022057 A1 | 1/2007 | Benson et al. |
| 2007/0164857 A1* | 7/2007 | Odenwald ............. G06Q 10/08 340/539.22 |
| 2007/0182544 A1 | 8/2007 | Benson et al. |

OTHER PUBLICATIONS

"Neural Networks" Electronic Textbook Statsoft, 1998 p. 1-31.

Office of Technology Assessment (OTA), Information Technologies for the Control of Money Laundering, OTA-ITC-630, GPO stock #052-003-01436-0, Sep. 1995, pp. 1-144.

Roberts, The Use of Imprecise Component Reliability Distributions in Reliability Calculations, IEEE Transactions on Reliability, vol. 45. No. 1, Mar. 1996, pp. 141-144.

International Preliminary Report on Patentability for PCT Application No. US2006/016895, dated Nov. 15, 2007, 11 pages.

International Preliminary Report on Patentability for PCT Application No. US2006/017100, dated Nov. 15, 2007, 8 pages.

International Search Report for International application No. PCT/US2006/0017100 dated Feb. 13, 2007.

* cited by examiner

FIG. 2

| Microprocessor<br>Primary and Secondary<br>202 | Memory<br>ROM/RAM<br>Primary and Secondary<br>204 | Data Storage<br>Flash, Magnetic or Optical<br>Primary and Secondary<br>206 | Networking circuitry<br>Wireless<br>IR<br>cable<br>208 | Alarm<br>Audible<br>Visual<br>Door locks<br>210 | External Ports:<br>I/O<br>Display<br>Printer<br>Camera<br>Antenna<br>Sensors<br>212 |
|---|---|---|---|---|---|
| Air circulation system for remote collection of air samples (multiple ports for air hose connection)<br>214 | Global Positioning<br>216 | Digital Certificate Storage and Authentication<br>218 | Encryption and decryption of messages<br>220 | On-board power managment<br>I/O<br>Primary Battery<br>Backup Battery<br>Fuel cell<br>Hibernation<br>222 | Optional External Power<br>Transformer (up/down)<br>Converter (AC/DC)<br>Filtering<br>224 | Remote control of door/orifice entry/exit<br>226 |

SENSOR SUITE (PRIMARY AND SECONDARY)

| Airborne Chemical Sensor x2<br>228A | Radiation Sensor x2<br>228B | Temperature Sensor x2<br>228C | Additional Sensor x2<br>228D | Additional Sensor x2<br>228E | Additional Sensor x2<br>228F | Additional Sensor x2<br>228G | Additional Sensor x2<br>228H | Additional Sensor x2<br>228I | Additional Sensor x2<br>228J | Additional Sensor x2<br>228K |

200

| Slave Microprocessor 302 | Memory ROM/RAM Primary and Secondary 304 | Data Storage Flash, Magnetic or Optical Primary and Secondary 306 | Networking circuitry Wireless IR cable 308 | External Ports: I/O Display Printer Camera Antenna Sensors 312 |
|---|---|---|---|---|
| Air circulation system for remote collection of air samples (multiple ports for air hose connection) 314 | One or more sensor module 316 | Digital Certificate Storage and Authentication 318 | Encryption and decryption of messages 320 | On-board power managment I/O Primary Battery Backup Battery Fuel cell Hibernation 322 | Optional External Power Transformer (up/down) Converter (AC/DC) Filtering 324 |

| HEADER | | | | | | | | | | |
|---|---|---|---|---|---|---|---|---|---|---|
| Field | Description | Data | Version | Checksum | | | | | | |
| 1 | Digital signature | s7jf54kdh3 | 2.4 | 398735 | | | | | | |
| 2 | Customer ID | 12345 | | | | | | | | |
| 3 | Project ID | 8765 | | | | | | | | |
| 4 | Master Unit ID | 2098999 | | | | | | | | |
| 5 | Vessle / Structure ID | 999764 | | | | | | | | |
| 6 | Location ID | 2 | | | | | | | | |
| 7 | Logistics bill number | 1001 | | | | | | | | |
| 8 | Service Start/Stop | 0:00:12 | | | | | | | | |
| 9 | Replace previous script | | | | | | | | | |
| 10 | Script version nr. | | | | | | | | | |

| BODY | | | | | | | | | |
|---|---|---|---|---|---|---|---|---|---|
| Field | Service Description | Activate Sensor A | Activate Sensor B | Compare A to B | Sample Interval (seconds) | Transmit Interval (minutes) | Date and Timestamp | Log Data Locally | Encrypt | Authenticate |
| 1 | Temperature | Y | Y | Y | 5 | 30 | Y | Y | Y | Y |
| 2 | GPS location | Y | Y | Y | 5 | 30 | Y | Y | Y | Y |
| 3 | Atmospheric/barometric | Y | Y | Y | 5 | 30 | Y | Y | Y | Y |
| 4 | Radiation | Y | Y | Y | 60 | 360 | Y | Y | Y | Y |
| 5 | Chemical | Y | Y | Y | 60 | 360 | Y | Y | Y | Y |
| 6 | Image collection | Y | Y | Y | 120 | 720 | Y | Y | Y | Y |
| 7 | Sound collection | Y | Y | Y | 120 | 720 | Y | Y | Y | Y |
| 8 | RFID or nano-sensor | Y | Y | Y | 120 | 360 | Y | Y | Y | Y |
| 9 | On device tampering | Y | Y | Y | | | Y | Y | Y | Y |
| 10 | Check for signal jam | Y | Y | Y | | | Y | Y | Y | Y |
| 11 | QueryCOM channels | Y | Y | Y | | | Y | Y | Y | Y |
| 12 | Transmit data to base | Y | Y | Y | | | Y | Y | Y | Y |
| 13 | Sound Audible alarm | Y | Y | | | | Y | Y | Y | Y |
| 14 | Activate door locks | Y | Y | | | | Y | Y | Y | Y |

*FIG. 8*

TRUSTED MONITORING SYSTEM AND METHOD

CROSS-REFERENCE TO RELATED APPLICATIONS

This application is a continuation of and claims a benefit of priority from U.S. patent application Ser. No. 14/480,362, filed on Sep. 8, 2014, which is a continuation of U.S. patent application Ser. No. 13/724,942, filed on Dec. 21, 2012, issued on Sep. 9, 2014, as U.S. Pat. No. 8,830,053, which is a continuation of U.S. patent application Ser. No. 12/641,139, filed on Dec. 17, 2009, which is a continuation of U.S. patent application Ser. No. 11/418,380, filed on May 3, 2006, issued on Feb. 2, 2010 as U.S. Pat. No. 7,656,286, which claims priority of U.S. provisional application Ser. No. 60/677,164 filed on May 3, 2005, and of U.S. provisional application Ser. No. 60/735,539 filed on Nov. 10, 2005, all of which are incorporated herein by reference in their entirety.

U.S. patent application Ser. No. 11/418,380 is one of a set of related U.S. applications filed May 3, 2006, the set including: U.S. patent application Ser. No. 11/418,385 (now abandoned), Ser. No. 11/418,381 (now U.S. Pat. No. 7,609,159), Ser. Nos. 11/418,380, 11/418,472 (now abandoned), Ser. No. 11/417,910 (now abandoned), Ser. No. 11/418,496 (now abandoned), Ser. No. 11/417,887 (now U.S. Pat. No. 7,512,583), Ser. No. 11/418,448 (now U.S. Pat. No. 7,526,455), Ser. No. 11/418,382 (now abandoned), Ser. No. 11/418,395 (now abandoned), Ser. No. 11/418,447 (now abandoned), and Ser. No. 11/417,893 (now abandoned). Each of the set is incorporated by reference in its entirety.

BACKGROUND

Field

The field of the invention relates to wireless surveillance and tracking. More particularly, the invention relates to monitoring the state of potentially hostile environments and threat assessment.

Description of the Related Technology

In the aftermath of Sep. 11, 2001 (9/11), studies have focused on what could have been done before, during and after; either to have prevented it from happening or reduced the destruction and casualties. Two fundamental weaknesses have been identified: 1) the failure to gather, process and disseminate early indicators in an efficient manner, and 2) the lack of a common, interoperable communications platform for distributing all forms of information. Furthermore, the 9/11 attack pointed out the fact that virtually every building, vehicle, public venue and person, regardless of where it is in the world, is potentially vulnerable as a future target. Thus, there is a need for improved systems and methods for controlling security risks.

SUMMARY

The system, method, and devices of the invention each have several aspects, no single one of which is solely responsible for its desirable attributes. Without limiting the scope of this invention, its more prominent features will now be discussed briefly. After considering this discussion, and particularly after reading the section entitled "Detailed Description of Certain Embodiments" one will understand how the features of this invention provide advantages over other error management solutions.

An embodiment of this invention provides a trusted and highly reliable self-contained computer-controlled sensing device that can be configured to monitor any object with a variable number of sensors. Some aspects provide tempest construction and remote re-programmability. Thus some embodiments may be deployed for virtually any application from home security to aircraft security.

One embodiment is a surveillance system including a plurality of sensors configured to provide environmental and spatial data, and an electronic device configured to receive the sampled environmental and spatial data from the sensors. The electronic device is further configured to receive monitoring instructions, and to use the received monitoring instructions to process the received environmental and spatial data.

Another embodiment is a monitoring system including a plurality of sensors configured to sense information, and an electronic device configured to receive data from the sensors. The electronic device is configured to determine an alarm condition based upon the received data, and the electronic device compares the received data to a range of acceptable values and conducts a self-diagnosis prior to transmitting the alarm condition to a remote device.

Another embodiment is a monitoring system including a plurality of sensors configured to sense information, and an electronic device configured to receive data from the sensors. The electronic device is configured to determine an alarm condition based upon the received data, and the electronic device determines a state of reliability of the sensor that the data is received from, and conducts a self-diagnosis based on the determined state of reliability prior to transmitting the alarm condition to a remote device.

One embodiment is a surveillance system including a plurality of sensors configured to sample environmental and spatial conditions, and an electronic device configured to receive data from the sensors. The electronic device is further configured to monitor the received data for anomalies by comparing the received data to a range of acceptable values, and the electronic device includes a motion sensor configured to detect unauthorized contact with the electronic device.

Another embodiment is a system including a sensor configured to sample environmental and spatial conditions, where the sensor includes a motion sensor. The system also includes an electronic device configured to receive data from the sensor and to determine integrity of the received data. The electronic device is further configured to monitor data received from the motion sensor to detect unauthorized contact with the sensor.

Another embodiment is a surveillance system including a plurality of sensors configured to sample environmental and spatial conditions, and an electronic device configured to receive data from the sensors. The electronic device is further configured to monitor the received data, and the electronic device includes a motion sensor. The electronic device is further configured to transmit an alarm condition to a remote device if the motion sensor data indicates that the electronic device moves outside of a pre-defined area.

Another embodiment is a monitoring system including at least one sensing device including a plurality of sensors including a motion sensor, and an electronic device configured to receive data from the sensing device. The electronic device is further configured to monitor the received data and to determine integrity of the received data. The electronic device further is configured to monitor data received from the motion sensor to detect movement of the sensing device, and the electronic device is further configured to transmit an alarm condition to a remote device if the motion sensor data indicates that the sensing device moves outside of a pre-defined area.

Another embodiment is a system including a plurality of sensors, and an electronic device configured to receive data from the sensors, where the electronic device is configured to transmit sensor data in a secure manner to a remote server, and where the electronic device includes a sensor for detecting jamming.

One embodiment is a system including a plurality of sensors, and an electronic device including at least two redundant processors each configured to receive data from the sensors and determine an alarm condition. The electronic device confirms determination of an alarm condition by both processors before generating an alarm signal.

Another embodiment is a surveillance system including a plurality of redundant sensors, and an electronic device configured to receive data from at least two of the redundant sensors and determine an alarm condition based on redundant data received from each of the redundant sensors. The electronic device confirms determination of an alarm condition by a majority of the redundant sensors before generating an alarm signal.

Another embodiment is a system including at least one sensor configured to sample environmental and spatial conditions and to transmit the sampled data over a plurality of communication links to an electronic device, and an electronic device configured to receive data from the sensors over the two communication links and determine integrity of the data received over the two communication links. The electronic device determines one of the communication links to be unreliable based on the integrity of the data received.

Another embodiment is a redundant surveillance system including a first monitoring device configured to receive data over a first communication link, a second monitoring device configured to receive data over a second communication link, and a plurality of redundant sensors in a secure container configured to sample environmental and spatial conditions configured to transmit the sampled data over a the first communication link to the first monitoring device. The redundant sensors are configured to receive confirmation of receipt of the data from the first monitoring device over the first communication link, and where the redundant sensors are configured to transmit the sampled data to the second monitoring device over the second communication link to the second monitoring device.

One embodiment is a monitoring system, where the monitoring system includes a plurality of communication devices that are authorized to communicate in the monitoring system. The system also includes a plurality of sensors authorized and configured to communicate in the monitoring system, and an electronic device authorized to communicate in the monitoring system and configured to receive data in a secure manner from the sensors when a task authorization message is received and authenticated as having been transmitted from a remote master device authorized to communicate in the monitoring system. The task authorization message includes information identifying at least the sensor from which to receive the data, and the electronic device authenticates and encrypts the received data prior to transmitting the received data to the remote master device.

Another embodiment is a monitoring system, where the monitoring system includes a plurality of communication devices that are configured to communicate in a secure manner in the monitoring system, the system including a plurality of non-system sensors configured to sense information, where the non-system sensors are not authorized to communicate securely in the monitoring sensor, and an electronic device authorized to communicate in the monitoring system and configured to receive data from the non-system sensors when a task authorization message is received and authenticated as having been transmitted from a remote master device authorized to communicate in the monitoring system. The task authorization message includes information identifying at least the non-system sensor from which to receive the data, and the electronic device authenticates and encrypts the received data prior to transmitting the received data to the remote master device.

Another embodiment is a monitoring system, where the monitoring system includes a plurality of communication devices that are authorized to communicate in the monitoring system. The system also includes a plurality of sensors configured to sense information, where the sensors are authorized and configured to communicate in the monitoring system, and where the sensors are configured to be in a sleep mode until activated by a task authorization message received from a master device authorized to communicate in the monitoring system, and an electronic master device authorized to communicate in the monitoring system and configured to transmit a task authorization message to the sensors. The task authorization message includes information identifying at least the sensor from which to receive sensed information, and where the sensor encodes a digital signature and encrypts the sensed information prior to transmitting the sensed information to the electronic master device.

Another embodiment is a monitoring system, where the monitoring system includes a plurality of communication devices that are authorized to communicate in the monitoring system, where the system includes a plurality of sensors, and an electronic device authorized to communicate in the monitoring system and configured to receive data from the sensors when a task authorization message is received and authenticated as having been transmitted from a remote master device authorized to communicate in the monitoring system. The task authorization message includes information identifying at least the sensor from which to receive the data, the electronic device authenticates and encrypts the received data prior to transmitting the received data to the remote master device via a first communication pathway, and the electronic device is configured to confirm receipt of the transmitted data by the remote master device.

One embodiment is a monitoring system including an environmental sensor configured to detect environmental information associated with an object, an identification sensor configured to identify the object, a timing device configured to provide time information including a time of day and a date, a location sensor configured to receive location information, and an electronic device configured to receive data from the environmental sensor, the identification sensor, the timing device and the location sensor. The electronic device is further configured to transmit the received data such that the timing information, object identification information, the location information and the environmental information can be linked together, where the linked data is transmitted to a remote device in a secure manner.

Another embodiment is a container monitoring system including a plurality of sensors configured to detect environmental information about an area inside or outside the container, a timing device configured to provide time information including a time of day, a location sensor configure to receive location information, and an electronic device configured to receive data from the plurality of sensors, the timing device and the location sensor. The electronic device is further configured to transmit the received data such that the timing information, the location information and the environmental information is synchronized, where the synchronized data is transmitted to a remote device in a secure manner.

Another embodiment is a portable monitoring system including a tempest constructed housing to provide shielding for enclosed devices. The housing encloses an environmental sensor configured to detect environmental information, a timing device configured to provide time information including a time of day and a date, a location sensor configured to receive location information, and an processor configured to receive data from the environmental sensor, the timing device and the location sensor. The electronic device is further configured to transmit the received data such that the timing information, object identification information, the location information and the environmental information is synchronized, where the synchronized data is transmitted to a remote device in a secure manner.

One embodiment is a system including a plurality of sensors, a remote device configured to transmit secure instructions, and an electronic device configured to receive data from the sensors. The electronic device is further configured to receive the secure instructions from the remote device, where the secure instructions direct the electronic device to receive data from one or more of the sensors.

Another embodiment is a method including receiving data at an electronic device from a first sensor, and receiving instructions from a remote device, where the instructions direct the electronic device to receive data from a second sensor instead of the first sensor. The method also includes discontinuing the receiving of data from the first sensor, and receiving data at the electronic device from the second sensor.

Another embodiment is a system including a plurality of sensors, a remote device configured to transmit encrypted monitoring instructions, and an electronic device configured to receive data from the sensors. The electronic device is further configured to receive and decrypt the monitoring instructions from the remote device via a network, where the monitoring instructions include a monitoring schedule for one or more of the plurality of sensors, and the electronic device is configured to received data from the sensors in accordance with the received monitoring schedule.

Another embodiment is a method including receiving an encrypted monitoring schedule from a remote device, where the monitoring schedule defines a sensing schedule for a plurality of sensors and where the monitoring schedule identifies at least one alarm threshold. The method also includes decrypting the monitoring schedule, receiving data from one or more sensors based upon the received sensing schedule, determining an alarm condition based upon the alarm threshold and data received from the sensor, encrypting notification of the alarm condition, and transmitting the encrypted notification of the alarm condition to the remote device.

Another embodiment is a system including a plurality of sensors, a remote device configured to transmit encrypted monitoring instructions, where the encrypted monitoring instructions include a tolerance range for at least one of the sensors, and an electronic device configured to receive sensor data from the sensors. The electronic device is further configured to receive, authenticate and decrypt the encrypted monitoring instructions from the remote device, the electronic device configured to compare the sensor data to the received tolerance range.

Another embodiment is a method including receiving encrypted monitoring instructions from a remote device, where the monitoring instructions include a tolerance range for sensed data from at least one sensor. The method also includes decrypting the monitoring instructions, determining whether the sensed data are within the identified tolerance range, and transmitting an encrypted alarm signal to the remote device when the sensed data falls outside the identified tolerance range.

Another embodiment is a system including a plurality of sensors, a remote device configured to transmit encrypted monitoring instructions, where the encrypted monitoring instructions identify one or more of the plurality of sensors. The system also includes a sensing schedule, and one or more alarm thresholds, and an electronic device configured to receive sensor data from the sensors in accordance with the sensing schedule. The electronic device is further configured to receive and decrypt the monitoring instructions, and to identify alarm conditions based upon the identified alarm thresholds and sensed data from the sensors.

Another embodiment is a method including receiving encrypted monitoring instructions from a remote device, where the monitoring instructions include a tolerance range for sensed data from at least one sensor. The method also includes decrypting the monitoring instructions, determining whether the sensed data are within the identified tolerance range, and transmitting an encrypted alarm signal to the remote device when the sensed data falls outside the identified tolerance range.

BRIEF DESCRIPTION OF THE DRAWINGS

FIG. 2 is a functional block diagram of certain components of a master unit.

FIG. 3 is a functional block diagram of certain components of a remote sensor unit.

FIG. 8 is a master unit task assignment script for communicating task assignments to a master unit.

DETAILED DESCRIPTION

Figure 1A:
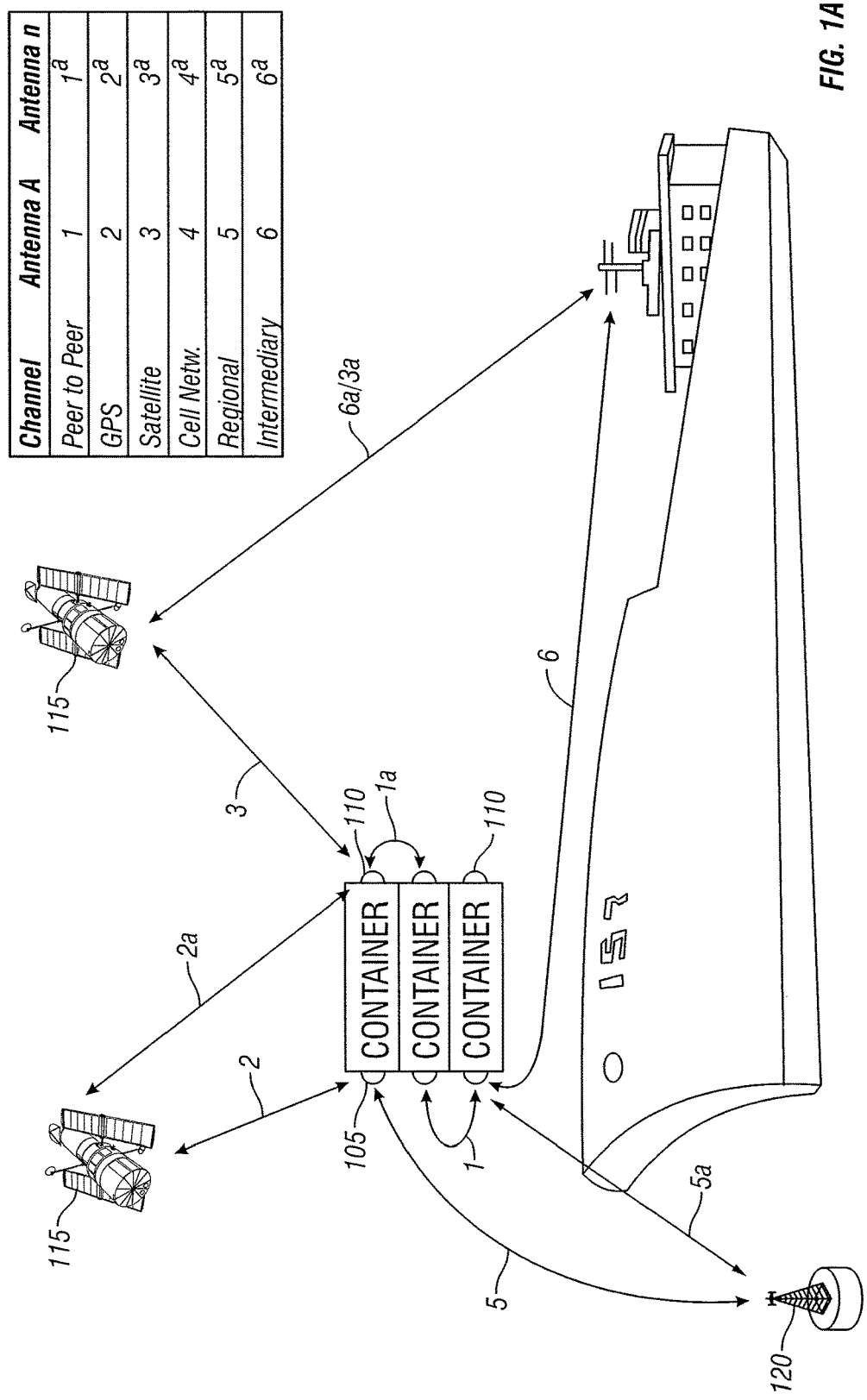
FIG. 1A illustrates an example of a communication system for providing redundant communications between one or more master units and one or more remote sensor units.

Methods and apparatus for monitoring remotely located objects with a system comprised of at least one master data collection unit, any number of remote sensor units, and a central data collection server are described. The master unit can be configured to monitor any object, mobile or stationary, including monitoring multiple remote sensor units associated with the objects being monitored. The master unit may be in a fixed location, or attached to a mobile object. The master unit can be configured for monitoring objects that enter and leave the area where it is located. The master unit may act as a parent controller for one or more child devices, wherein the child devices can be remote sensors or monitors of various measurable conditions including environmental conditions, substance identification, product identification and biometric identification. The master unit may be able to discover new remote sensor units as they enter or leave the area where the master unit is located. The master unit may be able to be remotely reprogrammed. The reprogramming may be accomplished with authenticated instructions.

The remote sensor units are configured to communicate with the master unit. The communication can be over a secure communication link. Remote sensors can be commanded to provide monitored information to the master unit on an as needed basis, on a fixed time basis or in other ways. Remote sensor units may be connected to various peripheral measuring devices.

The central data collection server is connected to the master unit via one or more communication links. The central data collection server can send instructions to the master unit over the one or more communication links. The instructions can include monitoring task instructions, reprogramming instructions, diagnostic test instructions and others.

Redundancy of system elements adds to the reliability of the system. In some embodiments, each unit (e.g., central data collection servers, master units and remote sensor units can communicate over at least two communication links to at least two other entities. In some embodiments, independent (redundant) encryption key exchanges are used for all messaging between the various units. In some embodiments redundant power supplies are used for the units.

What follows is the description of a universal "black-box" surveillance device capable of use in buildings, bridges, vehicles or containers so as to create a uniform surveillance infrastructure across all vertical applications. Each device would be configured to sample, transmit and process phenomena in exactly the same manner so as to eliminate the notorious problem with data analysis—comparing 'apples' data to 'oranges' data. By standardizing all common processes, this invention overcomes the stovepipe nature of traditional solutions and opens the door to near real-time sharing of early-warning data. Indeed, managers of critical infrastructure are increasingly acknowledging their interdependence and desire to collaborate on the creation of a 360 degree surveillance capability built for interoperability with a goal of prevention.

In the following description, specific details are given to provide a thorough understanding of the disclosed methods and apparatus. However, it will be understood by one of ordinary skill in the art that the disclosed methods and apparatus may be practiced without these specific details. For example, electrical components may be shown in block diagrams in order not to obscure certain aspects in unnecessary detail. In other instances, such components, other structures and techniques may be shown in detail to further explain certain aspects.

It is also noted that certain aspects may be described as a process, which is depicted as a flowchart, a flow diagram, a structure diagram, or a block diagram. Although a flowchart may describe the operations as a sequential process, many of the operations can be performed in parallel or concurrently and the process can be repeated. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function.

FIG. 1A illustrates an example of an infrastructure of a communication system for providing redundant communications between one or more master units and one or more remote sensor units. The example illustrated is a cargo ship with multiple shipping containers 100. The shipping containers 100 may each have one or more master data collection units 105 (each container is depicted with one master unit 105 in this example). The containers contain objects (not shown) that may contain remote sensing units (not shown) attached to the objects. Additionally, remote sensing units 110 may be positioned at other areas in and/or outside the containers. In some cases a device may be connected to a plurality of antennae to overcome positioning problems (e.g., containers stacked on a ship).

Preferably, the remote sensor units 110 and the master units 105 communicate over two or more channels to one or more other communication links to two or more communication devices. As discussed above, the master units 105 communicate with one or more remote sensor units 110. However, the master units 105 can also communicate with various other communication devices and/or networks, either for the purpose of collecting data or relaying data to another device with a more robust direct communication channel, serving as a peer-to-peer or ad hoc-network. For example, the communication link 1 shows a master unit 105 communicating with another master unit 105. Communication link 2 shows a master unit 105 communicating with a satellite relay 115. The communication link 5 illustrates a master unit 105 communicating with a land or sea based antenna relay 120. The communication links 2a and 3 depict a remote sensor unit 110 communicating with two relay satellites 115. Communication link 1a depicts a remote sensor unit 110 communicating with another remote sensor unite 110 (e.g., a relay station). By having the secondary communication links 1, 1a, 2, 2a, 3, and 5, the instructions and/or responses to instructions can be forwarded to the intended remote sensor unit 110 or master unit 105. For example, a master unit 105 can communicate with the land or sea based antenna 120 which can then forward the communication to a second master unit 105 via a communication link 5a.

Intermediary relay stations may also be used in forwarding messages. For example, the remote sensor 110a may communicate a monitoring measurement to the relay satellite 115 on communication link 3, which the forwards the message to an on-ship intermediary satellite receiver via communication link 6a. The intermediary on-ship receiver can then forward the message to the master unit 105 (e.g., the master unit that requested a measurement from the remote sensor) via communication link 6. Other types of communication links not shown in FIG. 1 that can be part of the redundant communication infrastructure include cellular telephone networks, LANs (wired or wireless local area networks), WANs, and wired networks (for fixed location units).

Figure 1B:
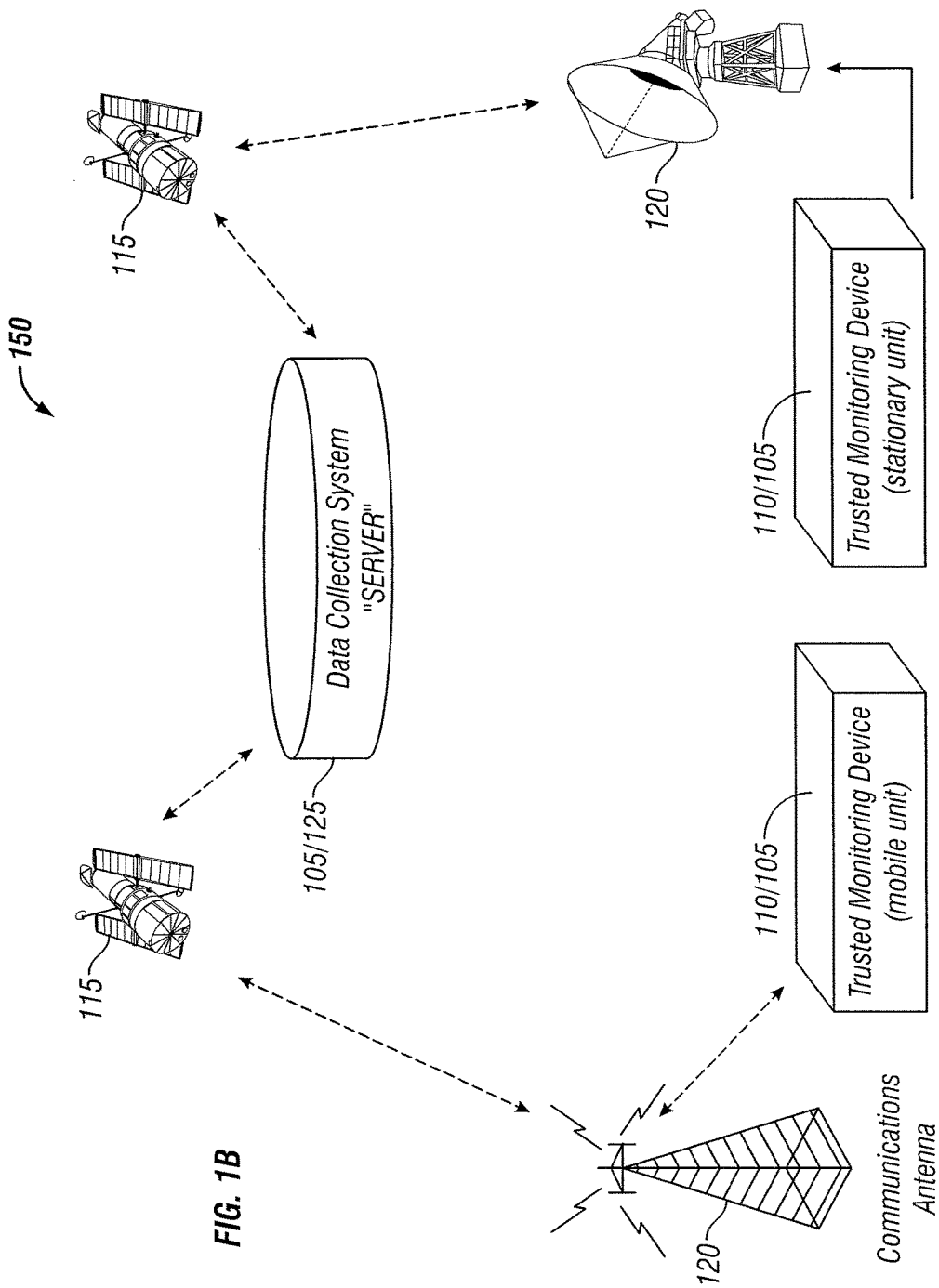
FIG. 1B illustrates another example of a communication system between communication devices.

FIG. 1B illustrates another example of a communication system between communication devices. The communication system can represent communication flow at multiple levels. In one embodiment the master unit 105 serves as a data collection server and communicates with one or more of the remote sensor units 110 that serve as trusted monitoring devices. At another level, the data collection server can be a central data collection server 125 that communicates with one or more master units 105 that serve as the trusted monitoring devices. Communications can be direct between the data collection server (105 or 125) and the trusted monitoring devices (110 or 105). Communications can also be relayed via one or more relay stations such as the relay satellites 115 and the antennas 120.

Redundancy of communication as illustrated by the various communication links of FIG. 1A is only one level of redundancy offered in some embodiments. Further reliability is afforded by other redundancy built into the master units and remote sensor units. FIG. 2 is a functional block diagram of certain components of a master unit, such as the master units 105 discussed above. The master unit system 200 preferably includes a redundant microprocessor component 202. However, a single microprocessor unit 202 could be utilized. The microprocessor 202 may be one or more of any conventional general purpose single- or multi-chip microprocessor such as a Pentium® processor, Pentium II® processor, Pentium III® processor, Pentium IV® processor, Pentium® Pro processor, a 8051 processor, a MIPS® processor, a Power PC® processor, or an ALPHA® processor. In addition, the microprocessor 202 may be one or more of any conventional special purpose microprocessor such as a digital signal processor. The microprocessor 202 is linked to various other modules on the master unit system 200 with conventional address lines, conventional data lines, and/or conventional control lines for purposes of data transfer, instruction reception and transmission and data processing.

Memory is provided by a memory component 204 and/or a data storage unit 206. Preferably, both the memory component 204 and the data storage unit 206 provide redundancy in the form of spatial redundancy (different portions of the same medium), or unit redundancy where two separate devices contain redundant data. Memory refers to electronic circuitry that allows information, typically computer data, to be stored and retrieved. Memory can refer to external devices or systems, for example, disk drives or tape drives. Memory can also refer to fast semiconductor storage (chips), for example, Random Access Memory (RAM) or various forms of Read Only Memory (ROM), that are directly connected to the processor. Other types of memory include bubble memory and core memory. Memory also includes storage devices (internal or external) including flash memory, optical memory and magnetic memory.

The master unit system 200 is comprised of various modules 208-228. As can be appreciated by one of ordinary skill in the art, each of the modules 208-228 comprise various sub-routines, procedures, definitional statements, and macros. Each of the modules 208-228 are typically separately compiled and linked into a single executable program. Therefore, the following description of each of the modules 208-228 is used for convenience to describe the functionality of the master unit system 200. Thus, the processes that are undergone by each of the modules 208-228 may be arbitrarily redistributed to one of the other modules, combined together in a single module, or made available in a shareable dynamic link library. Further each of the modules 208-228 could be implemented in hardware.

A networking circuitry module 208 contains logic and or circuitry for communication of various communication links such as the communication links 1 through 6 and 1a through 6a discussed above in reference to FIG. 1A. The networking circuitry module 208 may include circuitry for communicating over wireless communication links that may comprise, for example, part of a code division multiple access (CDMA or CDMA2000) communication system, a frequency division multiple access (FDMA) system, an orthogonal frequency division multiple access (OFDM) system such as WiMax (IEEE 802.16x), a time division multiple access (TDMA) system such as GSM/GPRS (General Packet Radio Service)/EDGE (enhanced data GSM environment) or TETRA (Terrestrial Trunked Radio) mobile telephone technology for the service industry, a wideband code division multiple access (WCDMA), a high data rate (1xEV-DO or 1xEV-DO Gold Multicast) system, or in general any wireless communication system employing a combination of techniques. The networking circuitry module 208 may include circuitry for communicating over wired communication links that may comprise, for example, coaxial cable, fiber-optic cable and others.

An alarm module 210 contains circuitry for receiving notification, via pushed messaging or through periodic monitoring of data from various alarm sensors. Alarm sensors may be linked via wired and or wireless communication links. The alarm sensors may monitor audible (audio) signals, visual (video) signals, or on/off type of alerts such as door locks, intruder alerts etc.

An external ports module 212 may provide I/O to various external devices including input/output devices, display devices, printers, cameras, antennas and remote sensors. Preferably, redundant wireless communication links are also provided, via the networking circuitry module 208, for any of the external devices connected via the external ports. Typically, the wired external devices are connected to the computer using a standards-based bus system. In different embodiments of the present invention, the standards based bus system could be Peripheral Component Interconnect (PCI), Microchannel, SCSI, Industrial Standard Architecture (ISA) and Extended ISA (EISA) architectures.

An air circulation component 214 may have multiple input ports for sampling air from various sources. Ducting is connected to the ports to be located in various areas of the monitored area. The air intake system includes a fan, a vacuum or other means of moving air so as to supply one or more sensors with unadulterated samples. Details of the air intake analysis system are discussed below.

A global positioning system (GPS) 216 is used to track the location of the master unit. The GPS module may be connected to an external antenna in situations where the master unit is housed in a shielded container or location. The GPS system can also receive measurements from remote sensor units that contain GPS tracking ability. Thus, multiple objects can be tracked by the same master unit. In addition, multiple sensor units containing GPS capability can combine their satellite signals in order to speed up convergence and capture of the necessary number of GPS satellites. GPS signals may also be combined with other signals to further refine the exact location of the object.

Instructions refer to computer-implemented steps for processing information in the system. Instructions can be implemented in software, firmware or hardware and include any type of programmed step undertaken by components of the system. Instructions received by and transmitted by the master unit 200 are typically encrypted. A digital certificate storage and authentication module 218 is used to establish secure connections with the multiple remote sensor units, relay units, intermediary units and central data collection servers of the global system shown in FIG. 1A. An encryption and decryption module 220 is used to encrypt messages transmitted by and decrypt messages received by the master unit 220. Redundant encryption keys can be used over the redundant channels for added security. The type of encryption for a given task shall be defined by the Assignment Script discussed below in reference to FIG. 8.

An on-board power management module 222 is used to monitor batteries, backup batteries, and/or fuel cells as well as external power source reliability and variability. The state of all power sources is monitored at periodic intervals for both quantity and quality so as to get early warning of future operational limitations.

An external power module 224 is used to convert power from multiple sources for use when available. The power module 224 can sense when the master unit is plugged into various voltage levels, AC and/or DC sources in order to power the unit in multiple areas of the world having different power levels and reliability. Filtering can be used to smooth out power surges in areas where the external power is unreliable. Switching to internal power can be automated when power spikes or power loss is detected. An uninterruptible power supply is preferred. In some embodiments, anomalies in the power supply are logged and reported to the central data collection server.

The remote control of door/orifice entry/exit can be monitored/controlled by module 226. The master unit can control the unlocking and or opening of doors using electromechanical, pneumatic devices or other means known to those in the art.

A suite of remote sensor command and control modules 228A to 228K, preferably all redundant, are used to connect peripherals directly to the master unit or to allow the master unit to interact with the remote sensors. The various remote sensor types will be presented below. Additional remote sensor suites can be added to the master unit by recognizing the presence of a new remote sensor. For example, the new remote sensor may be recognized by monitoring for and receiving an identification signal broadcast by the new remote sensor. The identification signal may contain identification information that identifies a type of sensor, a model number etc. The master unit can conduct authentication of the new remote sensor or transmit the identification information to a central server for evaluation and/or approval to communicate with the new sensor. The server can then send a new assignment script that includes new instructions for adding the new remote sensor to the monitoring schedule of the master unit. Additionally, new remote sensor slots can be added by remote programming in order to enhance the number of remote sensors that the master unit can recognize and/or command and interact with. In some embodiments, empty slots in the master device can be filled with new sensors or external, remote child sensors units can communicate with the master. Preferably, any sensor is first authenticated prior to communicating with a second device.

FIG. 3 is a functional block diagram of certain components of a remote sensor unit, such as the remote sensor units 105 discussed above. The remote sensor unit system 300 preferably includes a redundant microprocessor component 302. However, a single microprocessor unit 302 could be utilized. The microprocessor 302 may be one or more of any conventional general purpose single- or multi-chip microprocessor such as a Pentium® processor, Pentium II® processor, Pentium III® processor, Pentium IV® processor, Pentium® Pro processor, a 8051 processor, a MIPS® processor, a Power PC® processor, or an ALPHA® processor. In addition, the microprocessor 302 may be one or more of any conventional special purpose microprocessor such as a digital signal processor. The microprocessor 302 is used as the main computing source of various other modules on the remote sensor unit system 300 with conventional address lines, conventional data lines, and/or conventional control lines for purposes of data transfer, instruction reception and transmission and data processing. In some embodiments, the remote sensor unit acts as a slave device to the master unit, e.g., only doing a subset of the master device functions, e.g., not communicating with the central data collection server directly.

Memory is provided by a memory component 304 and/or a data storage unit 306. Preferably, both the memory component 304 and the data storage unit 306 provide redundancy in the form of spatial redundancy (different portions of the same medium), or unit redundancy where two separate devices contain redundant data. Memory refers to electronic circuitry that allows information, typically computer data, to be stored and retrieved. Memory can refer to external devices or systems, for example, disk drives or tape drives. Memory can also refer to fast semiconductor storage (chips), for example, Random Access Memory (RAM) or various forms of Read Only Memory (ROM), that are directly connected to the processor. Other types of memory include bubble memory and core memory. Memory also includes storage devices (internal or external) including flash memory, optical memory and magnetic memory.

The remote sensor unit system 300 is comprised of various modules 308-324. As can be appreciated by one of ordinary skill in the art, each of the modules 308-324 comprise various sub-routines, procedures, definitional statements, and macros. Each of the modules 308-324 are typically separately compiled and linked into a single executable program. Therefore, the following description of each of the modules 308-324 is used for convenience to describe the functionality of the remote sensor unit system 300. Thus, the processes that are undergone by each of the modules 308-324 may be arbitrarily redistributed to one of the other modules, combined together in a single module, or made available in a shareable dynamic link library. Further each of the modules 308-324 could be implemented in hardware.

A networking circuitry module 308 contains logic and or circuitry for communication of various communication links such as the communication links 1 through 6 and 1a through 6a discussed above in reference to FIG. 1A. The networking circuitry module 308 may include circuitry for communicating over wireless communication links that may comprise, for example, part of a code division multiple access (CDMA or CDMA2000) communication system, a frequency division multiple access (FDMA) system, an orthogonal frequency division multiple access (OFDM) system such as WiMax (IEEE 802.16x), a time division multiple access (TDMA) system such as GSM/GPRS (General Packet Radio Service)/EDGE (enhanced data GSM environment) or TETRA (Terrestrial Trunked Radio) mobile telephone technology for the service industry, a wideband code division multiple access (WCDMA), a high data rate (1xEV-DO or 1xEV-DO Gold Multicast) system, or in general any wireless communication system employing a combination of techniques. The networking circuitry module 308 may include circuitry for communicating over wired communication links that may comprise, for example, coaxial cable, fiber-optic cable and others.

An external ports module 312 may provide I/O to various external devices including input/output devices, display devices, printers, cameras, antennas and remote sensors. Preferably, redundant wireless communication links are also provided, via the networking circuitry module 308, for any of the external devices connected via the external ports. Typically, the wired external devices are connected to the computer using a standards-based bus system. In different embodiments of the present invention, the standards based bus system could be Peripheral Component Interconnect (PCI), Microchannel, SCSI, Industrial Standard Architecture (ISA) and Extended ISA (EISA) architectures.

An air circulation component 314 may have multiple input ports for sampling air from various sources. Ducting is connected to the ports to be located at various locations of the monitored area. The air intake system includes a fan, a vacuum or other means of moving air so as to supply one or more sensors with unadulterated samples.

A global positioning system (GPS) 316 is used to track the location of the remote sensor unit. The GPS module may be connected to an external antenna in situations where the master unit is housed in a shielded container or location. The GPS system can also receive measurements from other remote sensor units that contain GPS tracking ability and are in range of the remote sensor unit. Signal levels can be used to estimate ranges to other remote sensor units containing GPS modules 318. In addition, multiple sensor units containing GPS capability can combine their satellite signals in order to accelerate acquisition of the necessary number of GPS satellites.

Instructions received by and transmitted by the remote sensor unit 300 are typically encrypted. A digital certificate storage and authentication module 318 is used to establish secure connections with the multiple remote sensor units, relay units, intermediary units and central data collection servers of the global system shown in FIG. 1A. An encryption and decryption module 320 is used to encrypt messages transmitted by and decrypt messages received by the master unit 220. Redundant encryption keys can be used over the redundant channels for added security.

An on-board power management module 322 is used to monitor batteries, backup batteries, and/or fuel cells as well as external power source reliability and variability. In some embodiments, anomalies in the power supply are logged and reported to a controlling master unit or forwarded to another communication device as in a peer-to-peer and/or ad hoc network.

An external power module 324 is used to convert power from multiple sources for use when available. The power module 324 can sense when the master unit is plugged into various voltage levels, AC and/or DC sources in order to power the unit in multiple areas of the world having different power levels and reliability. Filtering can be used to smooth out power surges in areas where the external power is unreliable. Switching to internal power can be automated when power spikes or power loss is detected. An uninterruptible power supply is preferred.

Figure 4:
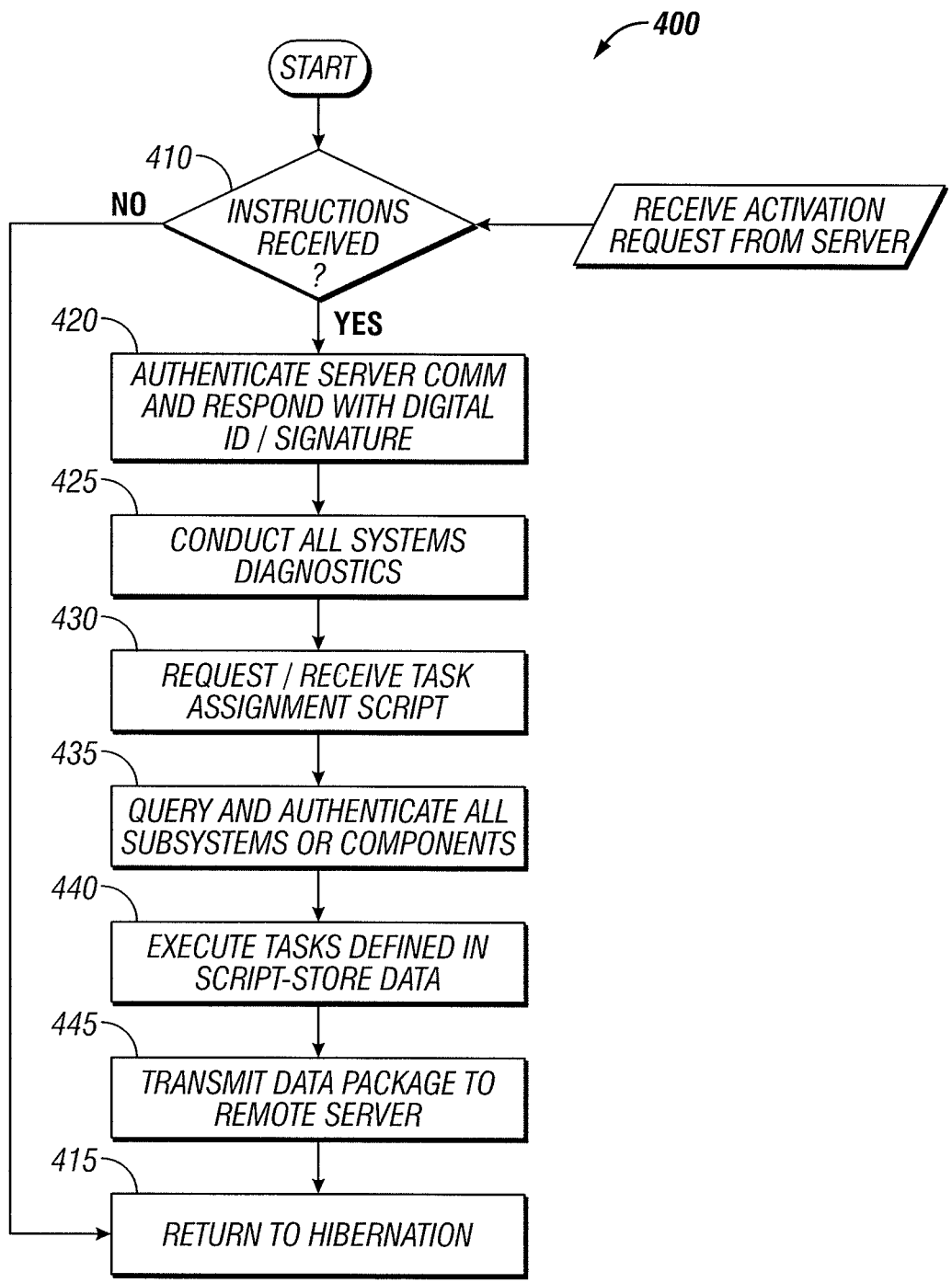
FIG. 4 is a flowchart illustrating certain blocks in a method of processing communications in a master unit.

FIG. 4 is a flowchart illustrating certain blocks in a method of processing communications in a master unit. The process 400 typically starts in a hibernation state. The master unit then transfers out of the hibernation state to step 410 in order to monitor one or more communication links for incoming instructions (e.g., from the central data collection server 125 in FIG. 1B). Monitoring for incoming instructions at step 410 can be continuous, periodic, or random. If no instruction is received at step 410, the process 400 proceeds to step 415 where it returns to the hibernation state. If instructions are received at step 410, the process 400 proceeds to step 420.

Step 420 involves authenticating the server from which the received instructions originated. Authentication can include known techniques such as digital IDs with corresponding digital signatures. If the authentication shows that the received message is authentic, the process 400 continues to step 425. However if the authentication shows the instructions to be false, the process 400 can return to the hibernation state or return to step 410 to detect another incoming instruction. Details of authentication will be discussed below in relation to FIGS. 6 and 7.

If the received instructions are authenticated at step 420, the process can continue at one or more other steps 430 to 445, depending on the received instructions. The instructions are preferably encrypted and the authenticating device decrypts the instructions before performing and/or instructing other devices to perform the tasks. The instruction may direct the master unit to conduct diagnostic tests, step 430, query and authenticate subsystem modules, components and/or remote sensor units, step 435, execute tasks defined in a script, step 440, and/or transmit data packages to one or more remote servers. After completing the instructed tasks the process 400 generally proceeds to step 415 and returns to the hibernation state. Details of the various actions taking place in the steps shown in FIG. 4 will be discussed below in relation to the individual tasks performed by the master unit.

Instructions received by the master unit while performing the process 400 may require the master unit to transmit instructions to one or more of the remote servers. Additionally, the master unit may be programmed to transmit instructions to remote sensors autonomously without receiving command instructions.

Figure 5:
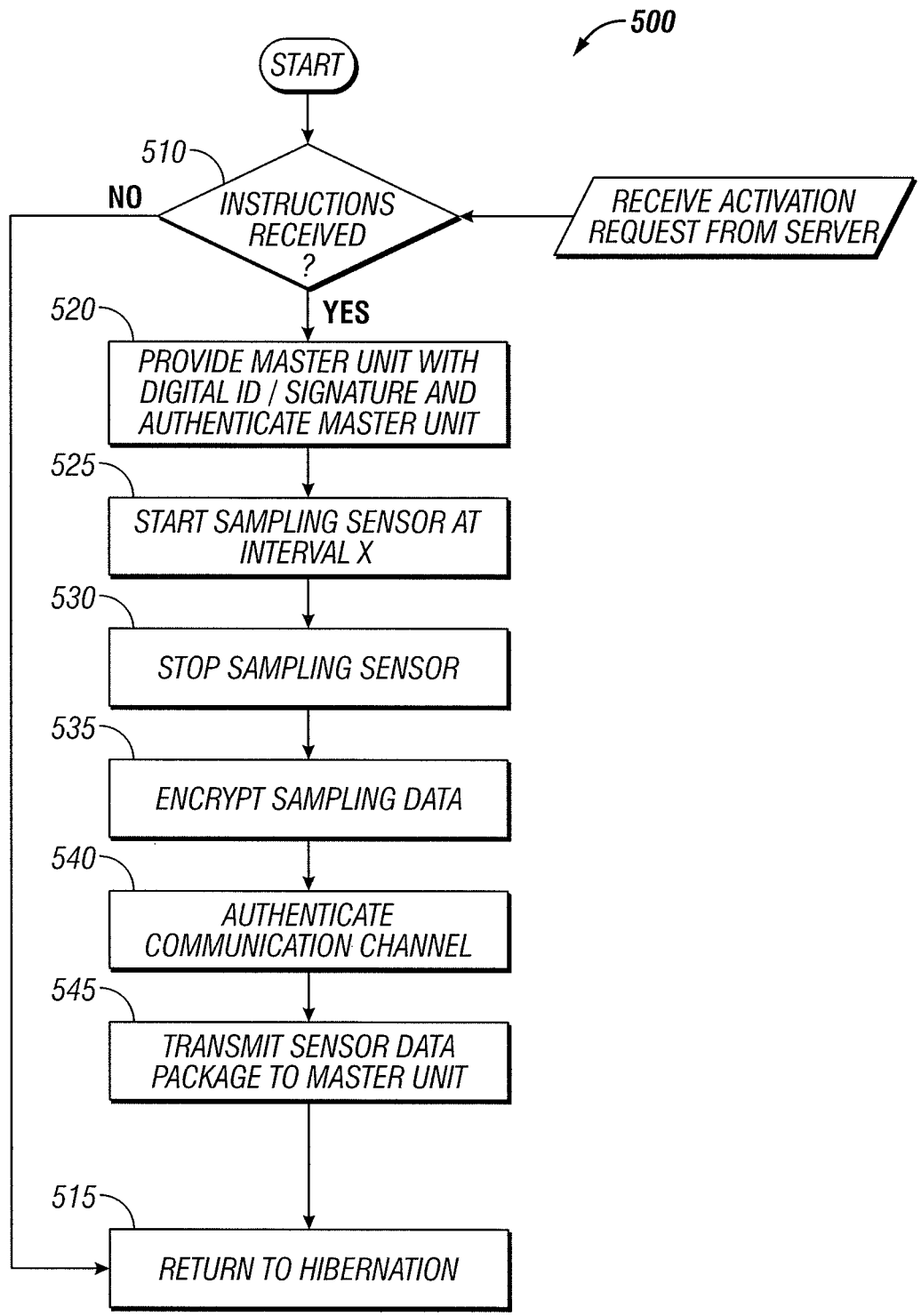
FIG. 5 is a flowchart illustrating certain blocks in a method of processing communications in a remote sensor unit.

FIG. 5 is a flowchart illustrating certain blocks in a method of processing instructions in a remote sensor unit. In this example, the instructions pertain to sampling a sensor measurement and transmitting the sampled data to the master unit. It should be noted, that the sensor unit can also be instructed to perform processing to that shown in FIG. 4 (e.g., diagnostic tests, reprogramming, etc.) The process 500 typically starts in a hibernation state. The master unit then transfers out of the hibernation state to step 510 in order to monitor one or more communication links for incoming instructions (e.g., from the master unit 105 in FIGS. 1A and 1B). Monitoring for incoming instructions at step 510 can be continuous, periodic, or random. If no instruction is received at step 510, the process 500 proceeds to step 515 where it returns to the hibernation state. If instructions are received at step 510, the process 500 proceeds to step 520.

Step 520 involves providing the master unit with the remote sensor unit's digital ID/signature, thus authenticating the remote sensor to the master unit that sent the instructions. Authentication can include known techniques such as digital IDs with corresponding digital signatures. The master unit can perform the authentication of the remote sensor's response and determine whether or not to use the forthcoming sensor data. Authentication of the master unit to the remote sensor can also be done at step 520. The master unit will provide a digital ID/signature in the instruction message received at step 510 and the remote sensor will authenticate the master unit. This two-way type of authentication protects both the master unit and the remote sensor from being hacked. If the authentication shows that the received message is from an authentic master unit, the process 500 continues to step 525. However if the authentication shows the instructions come from an unauthentic master unit, the process 500 can return to the hibernation state or return to step 510 to detect another incoming instruction. Details of authentication will be discussed below in relation to FIGS. 6 and 7.

If the received instructions are determined to be authentic at step 520, the process can continue at step 525 where the remote sensor unit samples one or more of the measurements that it is equipped to sample. The remote sensor may be instructed to sample for a certain time period or at a certain interval. If the sampling is to be terminated at a certain time, as per predetermined or received instructions, the sampling is stopped at step 530.

If the sampling is not stopped at step 530 (e.g., in a case where a sampling measurement is continued indefinitely or at least for a period of time longer than the time to update the master unit), the remote sensor unit may periodically transfer the sampled data to the master unit. Sampled data that is to be transferred to the master unit is preferably encrypted at step 535. Prior to transmitting the encrypted data, the remote sensor unit may proceed to step 540 to authenticate the master unit on the one or more communication channels that it will transmit the sampled data on.

If the authentication handshake at step 540 (which may be a two-way authentication) is completed successfully, the process 500 continues at step 545 where the sensor data is transmitted to the master unit. In some embodiments, the transmitted data can be digitally compressed. Various compression algorithms can be used to remove the redundancy in the transmitted data, thereby saving time, bandwidth, and/or power. After the sensor data is transmitted at step 545, the process 500 may return to the hibernation state to receive more instructions, or return to sampling the sensor data at step 530. In one embodiment, the remote sensor (or any other transmitting device) is configured to confirm receipt of the data by the master unit (or any other receiving device). If the remote sensor (or any other transmitting device) does not confirm receipt of the data by the master unit (or any other receiving device), the remote sensor can retransmit the data over a different communication path (e.g., one of the available redundant communication links). Redundant communication links may include any of those discussed above. Details of the other actions taking place in the steps shown in FIGS. 4 and 5 at the remote sensor unit will be discussed below in relation to the individual tasks performed by the sensor unit.

Figure 6A:
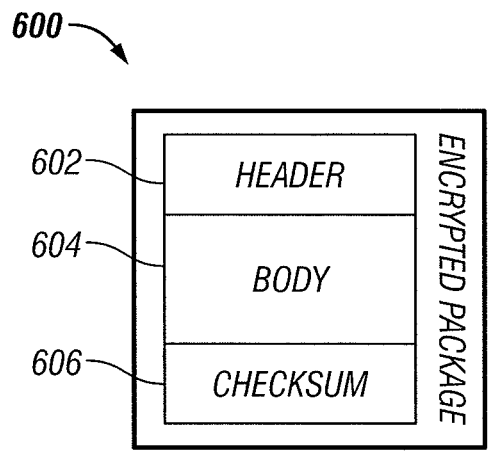
FIG. 6A is a data packet that may be used in communicating messages to/from the master units, the central data collection servers and/or the remote sensor units.

FIG. 6A is a data packet that may be used in communicating messages to/from the master units, the central data collection servers and/or the remote sensor units. The packet 600 includes a packet header 602, a packet body 604 and a packet checksum 606. The packet 600 is preferably encrypted as discussed above.

The packet header 602 can contain information necessary for identifying such things as the length of the packet, the ID of the recipient of the packet, the data stream ID that the packet is a part of and other information known to those of skill in the art.

The packet body 604 generally contains the message of the packet. The packet body 604 may contain instructions as discussed above, sensor measurement data etc. In some embodiments, the packet body 604 comprises digitally compressed information.

The packet checksum 606 contains encoded information, e.g., a cyclic redundancy check (CRC), which is used to determine the integrity of the packet when the packet is received. The checksum may protect the integrity of data by being used to detect errors in data that are sent through space (e.g., over a communication link) or time (e.g., storage). A checksum may be calculated by simply adding up the components of a message or a portion of a message. A checksum may also be based on the body of the packet containing the message or a portion of the message. Checksums may be an integer number of bits or bytes. A checksum may also be based on a cryptographic hash function. Unlike a simple additive checksum, a hash function may enable detection of a reordering of the bits in a message, inserting or deleting zero-valued bits or bytes and multiple errors that cancel each other out.

Figure 6B:
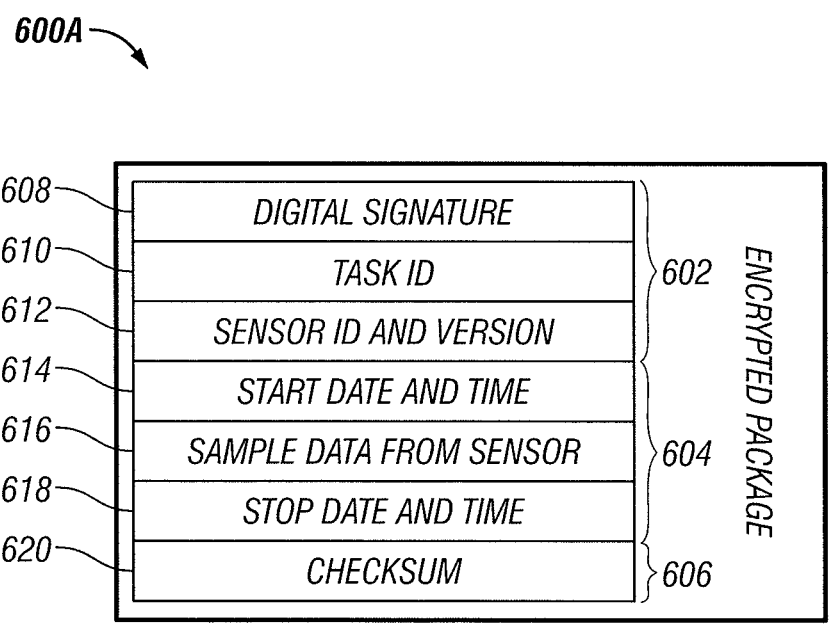
FIG. 6B is a data packet that may be used in communicating sampled sensor data from the sensor unit to the master unit.

FIG. 6B is a data packet that may be used in communicating sampled sensor data from the sensor unit to the master unit as in step 545 of the process 500. In this example, the packet 600A has a packet header 602 that includes a digital signature field 608, a task ID field 610 and a sensor ID and version field 612. The signature field 608 contains the digital signature that is used to authenticate the remote sensor to the master unit as in step 520 of the process 500.

The Task ID field 610 contains a sequence number that is used by the master unit to identify which task this message contains a response for. The master units may be monitoring many remote sensors, each of which may have several task IDs. The size of the task ID field 610, if a fixed number of bits, should be large enough to cover the largest number of simultaneous tasks that the master unit expects to submit. The task ID field 610 could be variable so as to allow expansion of the number of allowable task IDs to grow as the number of remote sensors which the master unit is control of grows.

The sensor identification field 612 contains information identifying the identity of a particular remote sensor. The sensor identification field 612 may contain indexed information that identifies a number of items such as, for example, the type of sensor (e.g., a temperature sensor, an air sampling sensor, a biometric sensor, etc.), the serial number of the sensor to distinguish from other sensors of the same type, and the version number of the sensor to distinguish software and/or hardware versions.

The packet 600A also contains fields 614 to 618. Field 614 contains the start date and time when the sampled measurements were sampled. The field 616 contains the sampled data that was sampled by the sensor from the start time to the stop time. The field 618 contains the stop date and time for the sampled data.

Field 620 contains the checksum that is used by the master unit in verifying the integrity of the data packet 600A. If the integrity is determined to be erroneous, then the master unit may request that the remote sensor retransmit the message.

Figure 7:
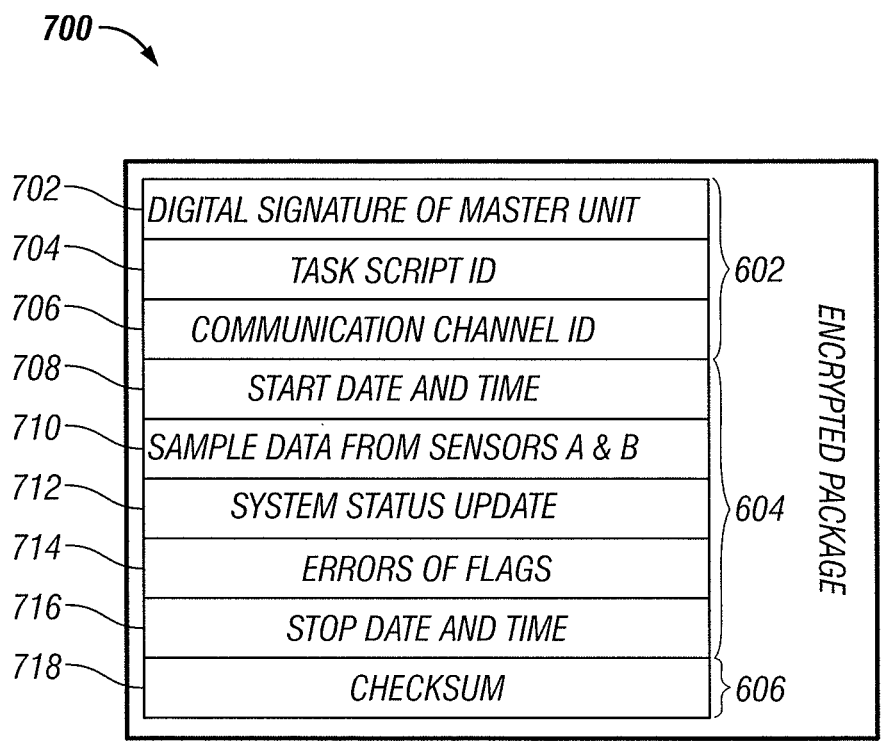
FIG. 7 is an example of a data package for communicating between a master unit and a base station.

FIG. 7 is a data packet that may be used in communicating data from the master unit to the central date collection server as in step 445 of the process 400. In this example, the packet 700 has a packet header 602 that includes a digital signature field 702, a task script ID field 704 and a communication channel ID 706. The signature field 702 contains the digital signature that is used to authenticate the master unit to the central data collection server.

The task script ID field 704 contains a sequence number that is used by the central data collection server to identify which task script this message contains a response for. Task scripts will be discussed below in relation to FIG. 8. As with the task ID field 610, the size of the task script ID field 704, if a fixed number of bits, should be large enough to cover the largest number of simultaneous task scripts that may be active simultaneously.

The Communication channel ID field 706 is used for audit trail tracking purposes. By combining the communication channel ID field 706 with the master unit ID (contained in the master unit digital signature field 702. Maintaining these audit trails may allow identification of compromised or unreliable devices and/or compromised communication channels. Maintaining audit trails may also allow identification of which information was sent by which device and when it was sent.

The packet body 604 of the packet 700 contains the fields 708 to 716 which contain the responses to the various script tasks that the central data collection unit requested of the master unit. The field 708 contains the start date and time for which the message contains monitoring information. The field 710 contains the data sampled from various sensors (two sensors A and B in this example). The field 712 contains system status information. This system status information may be the result of diagnostic test done on the master unit modules and/or components, or they may be the status of remote sensors that the master unit is the controlling parent of. Field 714 contains information regarding errors or flags identifying the errors. Such errors may include errors in previously received task script instruction messages. Field 716 contains the stop date and time for the data contained in the packet 700.

Field 718 contains the checksum that is used by the master unit in verifying the integrity of the data packet 700. If the integrity is determined to be erroneous, then the central data collection unit may request that the remote sensor retransmit the message.

FIG. 8 is a master unit task assignment script for communicating task assignments to a master unit. The header contains 10 fields containing information identifying the master unit that the script is targeted for. The digital signature field is used for authentication of the central data collection server (or other issuing device) that issued the script instructions. Other fields in the header may include a various task classifications including a customer ID, a project ID, and the targeted master unit ID. Other fields in the header may identify the location of the master unit including a vessel or structure ID and/or a location ID. Other header fields may include scheduling or sequence number information such as a logistics number field, a service start and/or stop time field, a field designating a previous script to be replaced by the current script and a script version number.

The body of the task assignment script assigns the tasks to the master unit in the form of an inventory list of all actions and devices approved to participate (or be utilized) in the current job. The body fields 1 through 14 list monitoring tasks to be performed utilizing preferably two remote sensors, designated sensor A and sensor B in this script. The sensors A and B may be pre-designated in a previous script or listed in the current script (not shown in FIG. 8). The master unit will record the various measurements of the service description tasks listed in the body of the task assignment script and log in the other portions of the inventory check list including a comparison check of sensor A to sensor B (e.g., for identification of a faulty sensor), a sample interval time, a transmit interval time, a date an time stamp that the measured data was transmitted back to a central data collection sever, a field identifying whether the data was logged locally, as well as records indicating whether or not the encryption key handshake and authentication tasks were completed successfully. By preferably using authentication and encryption at the data collection server, the master unit and the remote sensors, a secure system for remotely gathering information is formed.

In some embodiments, the master unit (or a data collection server) monitors data received from one or more trusted sensors for the purposes of determining an alarm condition. As discussed above in reference to the Alarm component 210 of FIG. 2, the master unit may receive an indication of a state of alarm from a remote sensor or a sensor connected directly to the master unit via one or more of the sensor suite ports 228A to 228K. However, the master unit may also make a determination of an alarm condition based on data received from remote sensors. In one embodiment, the data received from the remote trusted sensors is compared against a range of acceptable values. The master unit performs a self-diagnosis of the data received from the one or more trusted sensors in order to prevent false alarms. One method of performing the self-diagnosis involves receiving similar data from redundant remote trusted sensors. In one example, a majority rule is used where an alarm is issued if a majority of the similar sensors are transmitting data that is outside of the acceptable levels. If there are 2 redundant remote sensors, then the majority rule may require that both sensors measure unacceptable levels. If there are three redundant sensors, then receiving unacceptable levels from two out of the three will result in a determination of a state of alarm. In another embodiment, the self diagnosis is based on a state of reliability of the trusted monitor that the data is received from. If a remote sensor has previously been determined to be unreliable (e.g., using known methods of determining the integrity of the received data), then the master unit may require additional data (e.g., from other sensors or a retransmission of data from the same sensor) to make the self-diagnosis. Other self-diagnosis techniques that can indicate a corrupt or unreliable source of information include various forms of error checking such as cyclic redundancy checks and/or checksums. Another variation of diagnosis comprises running through a standardized set of routines or measuring something of a known value. The measured result is compared to known values in order to detect errors or to calibrate the device. It should be noted that the central data collection unit can perform similar alarm state determinations as those presented here, involving determining an alarm state of one or more master units and/or remote sensors. In some embodiments the alarm condition can have more than two states (other than an alarm state and a non-alarm state). For example, the alarm state may have several different levels of risk, such as for example, 3, 4, 5, 6, or more levels of risk with the severity of the risk condition increasing with each increase in alarm level. For example, if there are 4 alarm levels, alarm level 1 may be a condition where no received data lies outside the acceptable ranges (e.g., a no alarm state), level 2 may be if the received data from one or more sensors is approaching an unacceptable level, level 3 may be where the received data has exceeded the acceptable level but only by a small amount and the level 4 condition may cover when the received data exceeds the unacceptable level by more than the level 3 amount.

In some embodiments, a monitoring device (e.g., a master unit or a central data collection unit) can monitor certain information from a remote sensor and/or a master unit in an attempt to identify unauthorized tampering of a trusted device in the closed monitoring network. One example of a method of determining tampering of a device involves receiving information from a motion sensor. If a trusted device is a stationary (or mostly stationary) device, the a motion sensor can be monitored in order to determine possible tampering. For a stationary device, any motion above the noise level of the motion sensor may be used as an indication that someone or something has attempted to move or at least make contact with the stationary device. For other devices, a movement outside of a defined localized or proximal area may be an indication of tampering.

Besides motion sensors, other monitored information may be received and used to perform a self-diagnosis so as to determine improper tampering of the device from which monitored information is received. For example, various methods of detecting jamming signals, or detecting high levels of corruptly received data packets can be an indication of tampering. Such indications of tampering can be used to flag normally trusted devices of the network as untrustworthy. Checksums or CRCs are typically used to identify whether data has been modified between where it originated (e.g., at a trusted remote sensor) and where it was received (e.g., at a master unit and our a data collection server). Jamming signals may be detected by the resulting corrupt data (e.g., failures of CRCs or checksums). Jamming signals may also be detected directly by measuring the level of RF energy within a certain bandwidth of frequencies. High levels of RF energy within a certain bandwidth may be used as an indication that the certain bandwidth is being selectively jammed. Monitoring a plurality of sensors may add confidence to the positive (or negative) detection of jamming.

As discussed above, redundancy of information sources, processors, power supplies, communication links, memory, and communication devices of all kinds may add security and robustness to the information monitored in the monitoring system. Redundant processors may be monitored and if one is determined to be corrupted, the second one may serve as a temporary backup until the corrupt processor is fixed and/or replaced. Redundant sensors may be used to reduce the risk of false alarm by using a majority rules method of determining and issuing an alarm state as discussed above. Redundant power supplies may be utilized to lower the likelihood of power failure.

Redundant communication links offer many useful tools for increasing the security and thus the trustworthiness of the monitoring system of some embodiments. When more than two choices exist as candidates for the redundant communication links, the best choice can be determined in several ways. In one method, battery strength may be used in choosing which redundant communication links to use. If the on-board power management component 222 or 322 determines that the battery level of a master unit or remote sensor is low, the communication link requiring the lower transmit power may be the better choice. If battery life is not a problem, or an external power source with indefinite power availability is present, then the most power demanding communication link may be the best choice since it may prove more reliable and more secure. If a battery level is detected to be low, the power management component may activate a recharge state. Recharging can include use of an external AC or DC power supply, solar power generation, wind power generation or any of other power generating techniques known to those of skill in the art.

In another method, received signal strength may be used as a deciding factor in which communication link to used between two communication devices. The signal to noise ratio (SNR) of received data may be used as an indicator of a reliable channel. One artifact of jamming may be a low SNR measurement of received data. SNR may be used to detect jamming on a communication link. By monitoring the SNR of all available communication links, the communication link with the highest SNR may be chosen as a best link between two communication devices.

In another method, the urgency of the message and/or the security level of the information level being sent may be crucial in deciding which communication link to use. In a situation where the urgency in a message is important, then the estimated time to transmit and receive the message may be most important. If time is more critical then security, then a communication link that utilizes an encryption and/or authentication scheme that requires several handshakes may be less desirable than a communication link that has a simple fast way of establishing a link. Some types of information may call for higher levels of encryption and the communication links with the best encryption security may be chosen first.

In another method of choosing which of a plurality of communication links to use, some links may be disqualified from consideration of various reasons. Repeated failure of data integrity checks may rule out one or more communication links. Integrity check failures may be an indication of equipment failure (e.g., an obstructed antenna), jamming, power failure or other system failures. Redundant antennas may be employed to overcome equipment failure such as an obstructed antenna. Feedback of integrity check results may be used as an indication than one antenna is not as effective as another and the ineffective antenna may not be used until the effectiveness returns.

Redundant communication links need not be utilized simultaneously, although this is one option. Robust communications between two or more devices can be accomplished using a single communication link. Robust communications can be more likely if all data packets are encrypted and authenticated (e.g., signed with a digital signature). The likelihood of losing data can be reduced if large internal memory storage is provided for all communication devices. Redundant memory also reduces likelihood of loss of information due to storage device failure. Frequent handshakes between devices, for example frequent data receipt acknowledgements (Acks) can be used to verify receipt of data. Other methods of providing robust communication links will be apparent to those of skill in the art.

In a situation where a single active channel is being used to communicate between any two devices in the system, there is a chance that communications may be interrupted. In some embodiments that utilize a master/slave hierarchy, the master unit may revert to the beginning of the task being performed when communication was interrupted and restart the task. In some embodiments, both devices may keep a log of actions taken (for example, see the master unit task assignment script shown in FIG. 8) and communication may be reestablished at the last uncompleted task in the list.

Besides reducing the likelihood of a false alarm due to a failure of a single device, multiple remote sensors spread over a geographic area offer capabilities that single sensors do not offer. In some embodiments, redundant sensors can provide an indication of a location of an event or an object. For example, if there is a set of remote sensors for detecting radiation sources, a location of a source of radiation may be pinpointed by interpolating the strengths of the radiation measurements of each sensor. A radius of possible locations may be estimated for a given measurement and estimates from three remote sensors can be used to triangulate a two dimensional position of the source of the radiation. Four remote sensors can be used to located an object in three dimensions. Other examples include temperature sensors used to locate heat sources, and air quality sensors used to locate sources of contaminants. Another example uses multiple GPS receivers to more quickly acquire the number of satellites needed form establishing a GPS location measurement. The geographic diversity offered by spreading GPS receivers over an area decreases the likelihood of all the receivers being blocked (e.g., by buildings etc.). It should be noted that the remote sensors can be located in any of the communication devices discussed above including master units, remote sensors and data collection servers.

Another example of utilizing multiple sensors involves a system for tracking multiple packages or objects in a packaging system. Each of the packages has at least one sensor measuring at least one sensed input condition. The input condition may be a location measurement, an altitude measurement, a temperature, magnetic field measurement or other measurement. Each of the packages also has at least one telemetric communicator configured to provide (e.g., transmit) the sensed input to a coordinating device. The coordinating device is configured to process the sensed information. The telemetric communicator is configured to communicate the sensed information over a first communication link to the coordinating device. In one embodiment, if the first communication link is not available (as can be determined by an integrity check), the telemetric communicator is configured to transmit the sensed information to another telemetric communicator contained in another one of the packages. Thus, if one package is move out of range of the coordinating device, it may still communicate to the coordinating device via an ad hoc network of one or more packages. This type of networking can enable the detection of an object being moved (e.g., being stolen from a warehouse) to be identified and monitored for tracking purposes.

Other embodiments provide a system that can track not only the location of one or more objects, but may also verify that the proper individual is in possession of the object. These embodiments include an environmental sensor configured to detect environmental information about an object. The environmental sensor may detect a magnetic field, a radio field or some other field associated with the object. A product identification sensor is configured to receive information to identify the object. The object may contain an RFID tag to transmit to the product identification sensor for identification. There is also a biometric sensor configured to receive biometric information about an individual. In one aspect the biometric information is kept on record in a list of individuals permitted access to the object. The system may also include a GPS sensor configured to receive GPS location information. These sensors are all accessible to be monitored by a trusted electronic device such as, for example, the master control unit or the data collection server discussed above. The monitoring device can perform a diagnosis of the sensed information to assess whether the object being monitored is in danger of being moved and or tampered with by someone other than the permitted individuals.

Figure 9:
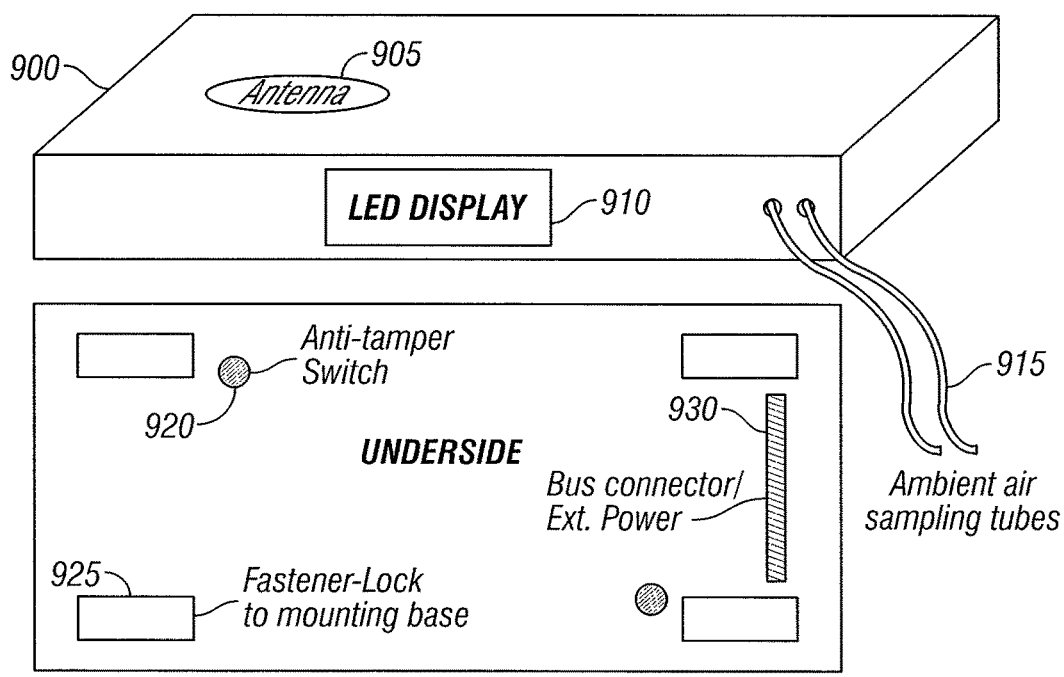
FIG. 9 is an example of a data collection unit housing.

The sensors in the examples discussed above do not need to be attached to the objects that they are tracking in all situations. FIG. 9 shows an example of a housing of a data collection unit. The data collection unit 900 may be a data collection server, a master unit or a remote sensor. The unit 900 in FIG. 9 contains an antenna 905 and an LED display 910. The data collection unit 900 also contains two air sampling tubes 915. The underside of the housing contains at least two pressure or proximity activated anti-tamper switches 920, a fastener 925 to lock to the mounting base and a bus connector 930 to attach to an optional external power supply, keyboard, display device or similar peripheral. Preferably, the housing of the unit 900 is of Tempest construction and shielded to resist external measurement devices from gaining access to magnetic and or electric emissions.

Figure 10:
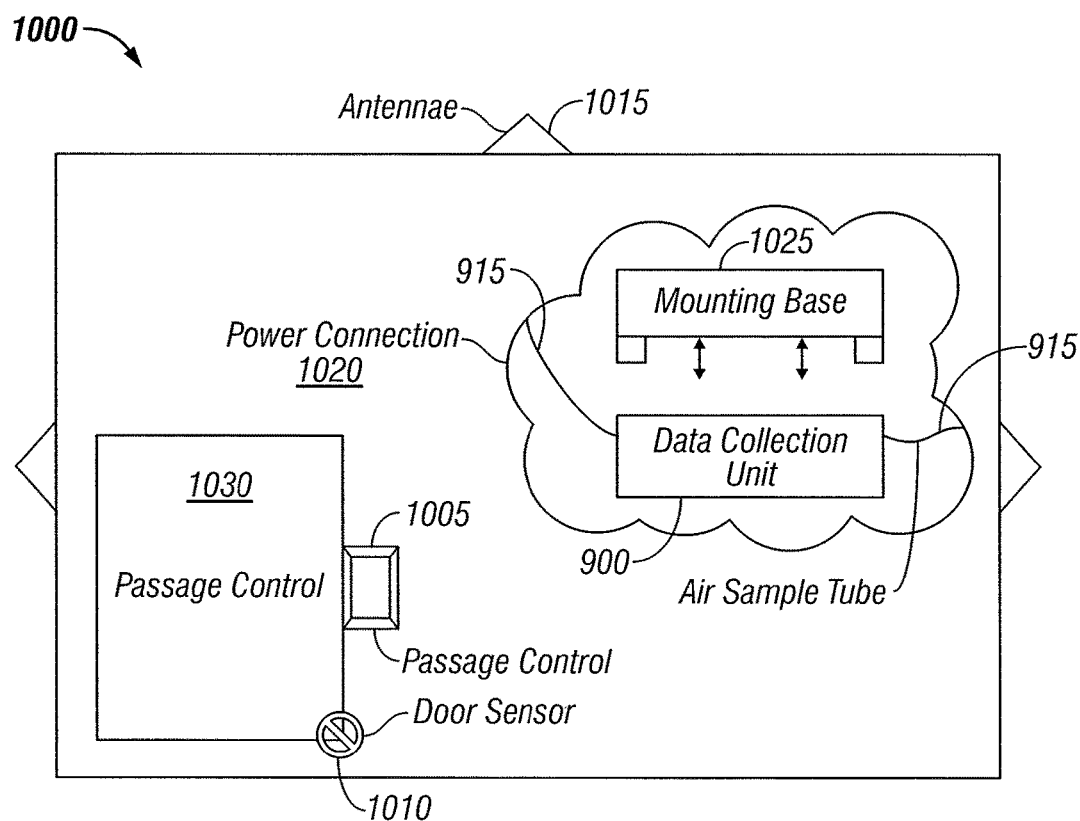
FIG. 10 depicts an example of placement of a data collection unit within a shipping container.

FIG. 10 depicts an example of placement of a data collection unit within a shipping container. The data collection unit 900 is mounted to a mounting base 1025. The mounting base 1025 may include one or more external power connections 1020, and be attached to the container 1000 so as to be difficult to remove. The container 1000 preferably includes multiple antenna 1015 (external and/or internal), where the container in FIG. 10 includes three external antenna. The multiple antenna can provide directional diversity for transmission and reception of signals in case one or more antenna are obstructed. The container 1000 can also comprise multiple internal sensors such as a passage control sensor 1005. The passage control sensor 1005 can permit individuals or objects with proper identification devices (biometrics, smart cards, RFID cards etc.) to enter the container 1000 or an area 1030 within the container. A door sensor 1010 may also indicate whether a door of the area 1030 within the container has been opened. Other sensors, not shown in FIG. 10, may include sensors for detecting the presence of certain objects within the container 1000. Such sensors may include ultrasound pattern sensors, radar or x-ray pattern sensors and others. The data collection unit 900 may use comparison of the ultrasound, x-ray and/or radar patterns to detect changes in the content and/or layout of objects in the container. This can allow for the detection of objects added, moved and/or removed from the container 1000.

Figure 11A:
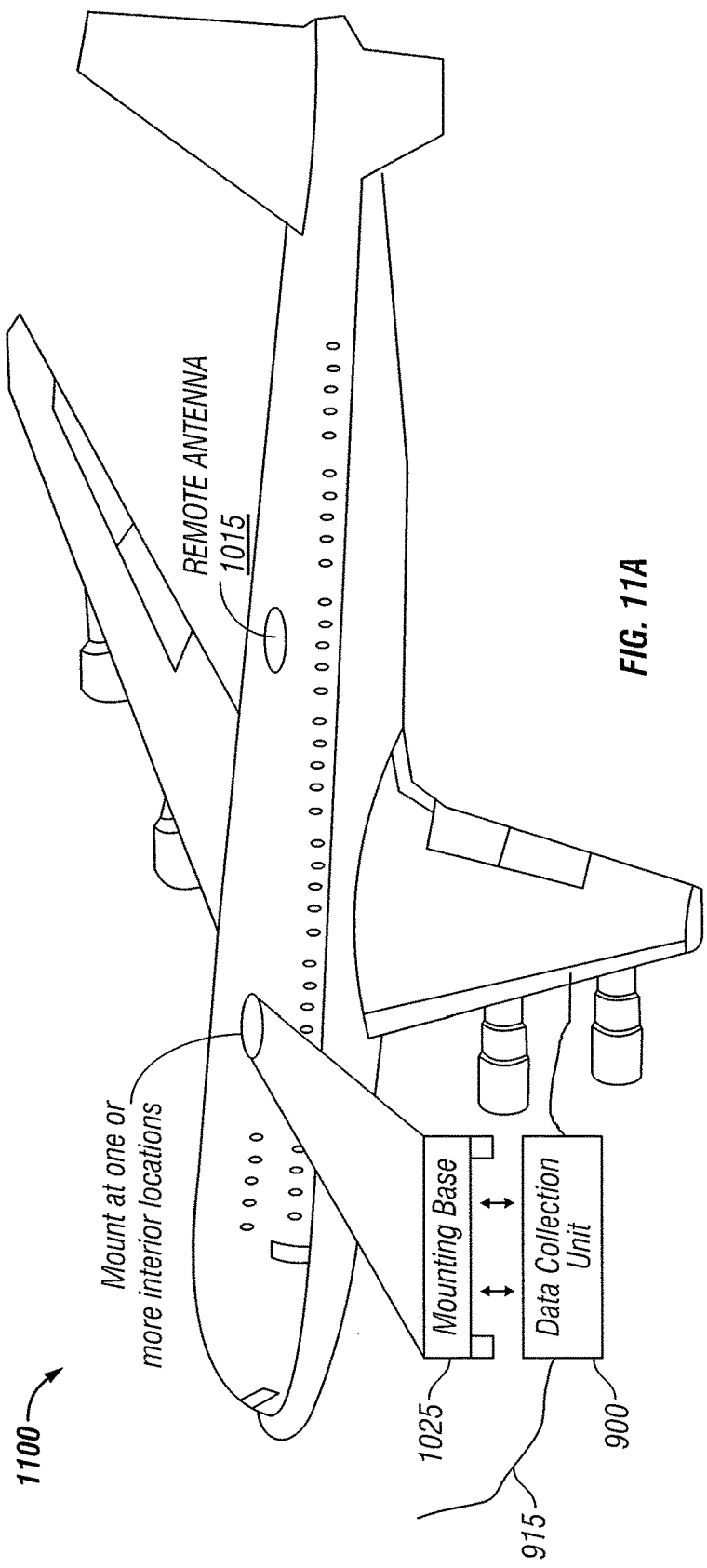
FIG. 11A to 11C show example embodiments of positioning of data collection units for use in the global communication system of FIGS. 1A and 1B.
Figure 11B:
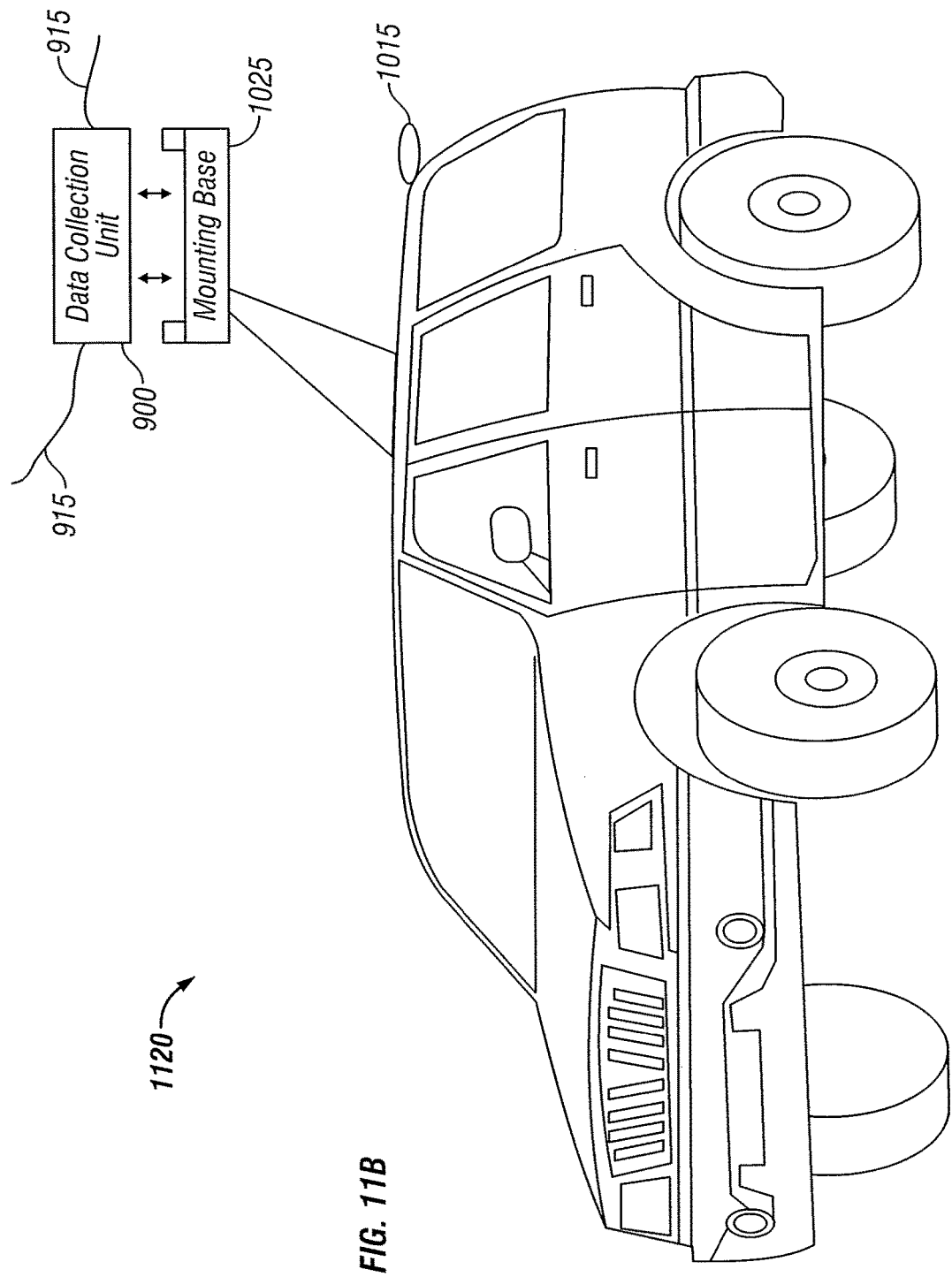
Figure 11C:
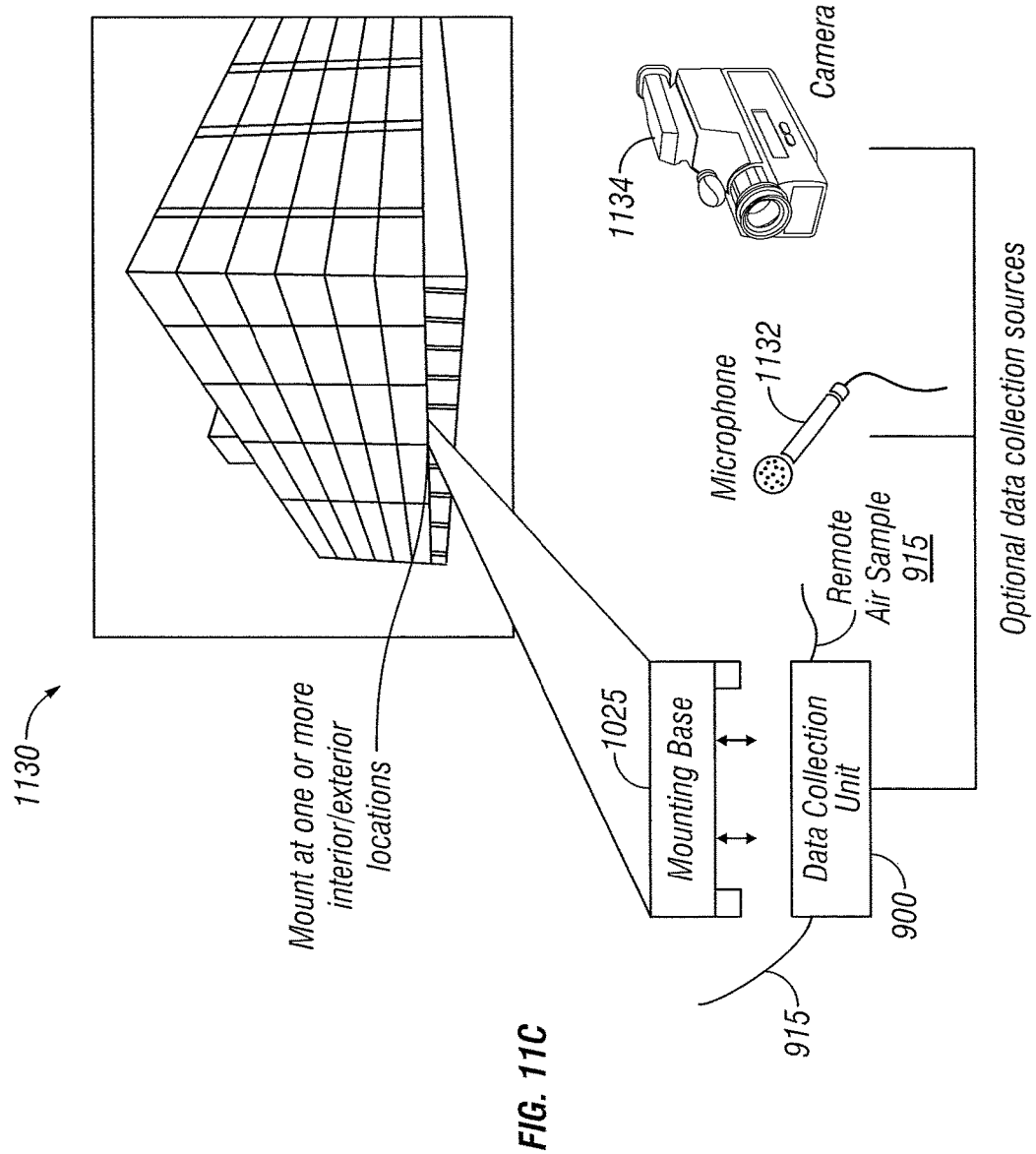

FIGS. 11A to 11C show other example embodiments of places for positioning of data collection units. FIG. 11A shows positioning of the data collection unit 900 within an airliner 1100. FIG. 11B shows positioning of the data collection unit 900 within an automobile 1120. FIG. 11C shows positioning of the data collection unit 900 within a building 1130. The embodiment in FIG. 11C includes an audio capture device 1132 and a video capture device 1134 that can be used to monitor audio and video/image data (e.g., of people entering and/or leaving the building 1130.

An exemplary use of some of the features of the monitoring system discussed above will now be described. This example describes a scenario for monitoring a shipping container. A central server of the monitoring system is provided information such as company information, product description and ID numbers (e.g. manifest), safety disclosures, customs disclosures, financial disclosures and receiver party information about the various items in the container.

The central server may also be provided with biometric data of authorized personnel permitted to access the container. Authorized personnel may have a hand-held-device (HHD) that is configured to communicate with a monitoring system in the container. Upon approaching the container an authorized person can scan the container's identifying information with the HHD at which point an authorization process determines whether to issue an electronic authorization key. The authorization process may include the authorized personnel scanning a biometric fingerprint with the HHD. The HHD can then perform an authentication process based on the biometric scan. If the authentication process is successful, the key can be transmitted to the Master Controller located inside the container.

The Master Controller (MC) receives the key and compares it to the most recent Job Assignment Script (JAS) received from the backend server. If the key codes match, the MC sends a signal to the solenoid to unlock the door of the container and simultaneously starts image capture from both the internal and external cameras. The cameras are remote sensors that the MC is in communication with. The images are stored to the local disk memory of the MC and every 100th frame may be relayed to the central server.

When the authenticated personnel enters the container, he may install the necessary sensors depending on the contents of the container. In this example, the personnel installs radiological sensors, one sensor in each corner of the container and attaches special ducting connected to the MC to pull air from several locations. He first scans each sensor device with the HHD, mounts the sensors securely in place, then transmits the data to the MC with the HHD. The MC compares the sensor codes to the JAS to verify authenticity and instructs each sensor to conduct a self-diagnosis and tamper check.

At this point the MC performs a complete self diagnostic routine of all sensors and systems, then sends the results to the central server. When the diagnostic tests are completed successfully, the server will respond to the MC with approval to reseal the container.

Upon arrival at the loading dock, an authorized personnel scans his personal and corporate ID badges on the scanner mounted on the container door. The codes are passed to the MC and compared with the values in the JAS. If the key codes match, the MC sends a signal to the solenoid to unlock the door of the container and simultaneously starts image capture from both the internal and external cameras.

As other personnel come within range of the container, scanners read each of their personal identity cards and the product codes in or on the boxes. In the meantime, the cameras are operating continuously to record all activity in the container. In this case, the JAS has dictated that all activity be recorded in a real-time log file and that it be relayed to the central server every five minutes. If any unauthorized personnel attempts to enter the container. Motion sensors can detect the presence of a moving body with no readable ID badge. The MC consults the JAS and finds that such breaches are to be handled with both a local audible alarm and a message to the central server.

Once loading is complete, the supervisor closes the container doors, scans his ID cards and enters a code confirming the loading is complete. The message is forwarded to the MC which then sends a signal to activate the solenoid thus locking the door. The MC performs an integrity check of all locks and orifice sensors, takes a baseline sample from all sensors activated as defined by the JAS. The results are relayed to the central server. If all data is in conformance, the server issues an authorization key to the MC which in turn illuminates green LEDs at several locations around the exterior of the container. At this point, the container is ready to be transported to the shipping terminal.

Prior to picking up the shipping container, the trucking company provides the central server with information including the truck ID number, the driver ID number, the relevant container ID and the shipper ID. An electronic authorization key is then transferred to the driver's HHD. Upon arrival at the Wang facility, the driver scans his index finger on his HHD, then scans the truck ID tags, the container ID and the Wang facility ID. The information is relayed to the MC in the container. The MC compares the information and keys to those received in the last JAS, and determines if they are consistent. In this case, the driver was replaced at the last minute and authorization was not received. The LEDs on the container turn red and the HHD instructs the driver to contact his management. His management repeats the registration procedure using his ID, and the central server issues new instructions to his HHD. These changes now allow the driver to successfully mount the container on his truck and remove it from the shipper premises.

When the container's MC detects movement due to the truck moving, it starts the transportation section of the JAS. In this case GPS antenna are scheduled to collect route information and the full range of environmental sensors are sampling every five minutes inside the container.

Both the shipping terminal operator and the ship captain can perform similar procedures as that of the trucking company above such that accountability for the container is never in question.

Once the ship is underway, the JAS for this particular container shipment dictates the following tasks: 1) Sample environmental once every 15 minutes, 2) Capture one image frame from each camera every five minutes, and 3) Transmit all samples to server once per hour.

The first time the MC attempts to communicate with the server, it detects a weak signal from all its own antenna as the container is surrounded by other containers. The JAS dictates a secondary alternative of peer to peer relay with adjacent containers. The MC for this container authenticates itself with a neighbor MC and requests relay which in turn does the same until a container is found with clear access and a strong signal to the satellite or relay antenna.

During the voyage to the destination port, the ship encounters a heavy storm with 30 foot seas. The MC's motion sensors detect pitching in excess of 30 degrees at 20 second intervals. As this value is well outside the norm (the acceptable ranges dictated by the JAS), the MC queries adjacent containers for redundant motion readings and determines that the reading is not in error nor is it significantly different than neighboring containers (an indication that the container is not being stolen). Through the voyage the cameras and audio sensors can record video and audio to detect shifting cargo that may result in product damage.

When the ship arrives in port at Los Angeles, the accountability procedures outlined above can be repeated for each handling situation and entity.

Well before the container arrives, authorized personnel of the receiving company can logon to the central server to track developments along the way.

When the container arrives at the destination dock, personnel can perform biometric authentication as was done in previous situations. The authorization information is relayed to the container's MC where it performs an authorization process to determine whether to issue an electronic key. The MC may consult with the server.

The Master Controller (MC) receives the key and compares it to the most recent Job Assignment Script (JAS) received from the backend server. If the key codes match, the MC sends a signal to the solenoid to unlock the door of the container and simultaneously starts image capture from both the internal and external cameras. The images are stored to the local disk memory and every 100th frame is relayed to the server.

At the destination unloading dock, personnel come within range of the container, scanners read each of their personal identity cards and the product codes in or on the boxes as they are removed from the container. Cameras operate continuously to record all activity in the container. In this case, the JAS has dictated that all activity be recorded in a real-time log file and that it be relayed to the server every fifteen minutes. This example is meant to describe the varied monitoring methods that some embodiments can provide.

Another exemplary use of some of the features of the monitoring system discussed above will now be described. This example describes the use of the technology for monitoring an office building.

The monitoring system in this example is used as a sentry system for the office building. The central server may be provided with information including company identifying information, business description and employee ID numbers, safety disclosures, structural disclosures, financial disclosures and vendor information.

A security personnel downloads authorization information to a handheld device (HHD) then scans his index finger to confirm identity. The HDD instructs him to retrieve a new device from SecureTech's inventory with ID nr 98765. The security personnel scans the box seal then performs a visual integrity inspection and enters his findings to the HHD. He then transmits the information to the sentry system Master Controller (MC) which performs an authorization process with a remote server to determine whether to issue an electronic key. If successful, the key is transmitted to the Master Controller along with its first Job Assignment Script (JAS).

The Master Controller (MC) receives the key and compares it to the most recent Job Assignment Script (JAS) received from the backend server. If the key codes match, the MC sends a signal to the solenoid to unlock the housing of the MC.

The security personnel then proceeds to follow instructions provided by the HDD to perform the following tasks:
1. Open the MC housing
2. Install one modular sensor controller inside the MC to detect proprietary equipment tags.
3. Connect the MC to pre-existing devices in the building:
    a. ID card readers
    b. Proprietary tag reader—sensor heads
    c. Cameras
    d. Door sensors
    e. Elevator activity sensors
    f. Wide-area microphones
    g. Portable x-ray bag scanner
    h. Air-ducting from all entry passages to the MC input portal.

Prior to mounting or connecting the MC, the security personnel scans each device with the HHD, mounts them securely in place, then transmit the data to the MC. The MC compares the sensor codes to the JAS to verify authenticity and instructs each sensor to conduct a self-diagnosis and tamper check.

Once installation of the remote sensors and the Sentry box has been completed, the MC performs a complete diagnostic routine of all sensors and systems, then sends the results to the remote server over both a wired and wireless link (redundant communication links). If all is in order, the server will respond with an activation key and issue a new JAS to the MC.

In one example scenario, exterior cameras detect a middle-aged man just outside the door for prolonged periods of time on three days in the same week. On Tuesday of the following week, the main exterior camera focused on the entrance became occluded (11:22:28). Upon detection, the MC referenced the backup measures specified in the JAS and immediately acted to reposition internal camera 4 in the lobby to point in the direction of the main entrance. Two minutes later (11:24:21), a heavily disguised person entered the lobby with a large suitcase. Since these two events fall outside the normal operating ranges for these two measurements as defined in the most recent JAS, the data is immediately relayed to the central server via both wired and wireless connections.

Such a message is accomplished using the following process steps.
1. The MC conducts a self-diagnosis of all critical components and stores the results;
2. Outbound data is assembled into a list of files and compressed to one package.
    a. Camera frames are synchronized with corresponding date/time
    b. Camera frames are linked to Lat/Long of building as well as position of the anomaly within a pre-defined grid for the space in question.
3. The JAS is consulted for the current encryption parameters and the above package is encrypted accordingly.
4. The message is digitally signed using the remote server's key
5. Identical copies of the package are sent via a wired and cell connection.
6. The MC waits for notice of successful receipt from the remote server.

Several minutes later, the MC detects abnormally high electromagnetic interference. As a result, the ID badge scanner malfunctions and permits an unauthorized person to slip into the main lobby. Already on heightened alert, the MC forwards the event immediately to the server and receives an instant response to shut down elevator operation and lock all exterior doors. All security personnel are alerted to the breach and the intruder is captured. This example is meant only to describe the varied monitoring methods that some embodiments can provide.

Additional innovative embodiments are contemplated.

In one innovative aspect a surveillance system is provided. The system includes a plurality of sensors configured to provide environmental and or spatial data. The system also includes an electronic device configured to receive the sampled environmental and or spatial data from the sensors. The electronic device is further configured to receive monitoring instructions, and to use the received monitoring instructions to process the received environmental and/or spatial data.

In some implementations, the system also includes a remote device configured to provide the monitoring instructions to the electronic device. The electronic device may be configured to authenticate the remote device prior to using the monitoring instructions to process the received environmental and/or spatial data. One or more of the sensors included in the system may be enclosed within a tamper and eavesdrop proof enclosure. In some implementations, the monitoring instructions may be contained in a script message. Them received monitoring instructions may be encrypted. In such implementations, the electronic device is further configured to decrypt encrypted monitoring instructions. It may be desirable for the electronic device to be further configured to compare at least a portion of the received sensor data to a range of acceptable values and to transmit the data to the remote device. The electronic device may be configured to conduct a self-diagnosis prior to transmitting the data to the remote device.

In another innovative aspect a monitoring system is provided. The monitoring system includes a plurality of sensors configured to sense information. The monitoring system also includes an electronic device configured to receive data from the sensors. The electronic device is configured to determine an alarm condition based upon the received data. The electronic device is configured to compare the received data to a range of acceptable values and conduct a self-diagnosis prior to transmitting the alarm condition to a remote device.

In some implementations the electronic device is configured to transmit the alarm condition to the remote device over a plurality of communication links. The plurality of communication links may include at least two or more of a code division multiple access system, a frequency division multiple access system, and orthogonal frequency division multiple access system, a time division multiple access system, a terrestrial trunked radio system, and a wideband code division multiple access system. The received data may include redundant data from two or more of the sensors. The electronic device may be configured to conduct the self-diagnosis based on a majority rule of the redundant data from the two or more sensors. The electronic device may also be configured to conduct the self-diagnosis by performing an integrity check of the received data. The electronic device may be further configured to determine the alarm condition to be in a state of alarm if the received data lies outside the range of this acceptable values and the self-diagnosis shows no failure conditions.

In yet another innovative aspect, a monitoring system is provided. The monitoring system includes a plurality of sensors configured to sense information. The monitoring system further includes an electronic device configured to receive data from the sensors. The electronic device is configured to determine an alarm condition based upon the received data. The electronic device is further configured to determine a state of reliability of the sensor that the data is received from. The electronic device is further configured to conduct a self-diagnosis based on the determine state of reliability prior to transmitting the alarm condition to a remote device.

In some implementations, the electronic device is configured to transmit the alarm condition to the remote device over a plurality of communication links. The electronic device may be configured to determine the state of reliability based on a checksum. The self-diagnosis may comprise the electronic device requesting a first sensor to retransmit the sensed information if the data from the first sensor is determined to be unreliable. The self-diagnosis may comprise the electronic device requesting a second sensor to retransmit redundant data if the data from a first sensor is determined to be unreliable where the redundant data is requested from substantially the same type of sensor and location. In some implementations the electronic device is further configured to compare the received data to a range of acceptable values. The electronic device may be configured to determine the alarm condition to be in a state of alarm if the data received from a first sensor lies outside the range of acceptable values and the self-diagnosis shows the first sensor to be reliable. In some implementations the alarm condition may include three or more levels of alarm.

In a further innovative aspect, another monitoring system is provided the monitoring system includes a plurality of communication devices that are authorized to communicate in the monitoring system. The system includes a plurality of sensors authorized and configured to communicate in the monitoring system. The monitoring system also includes an electronic device authorized to communicate in the monitoring system. Electronic device is further configured to receive data in a secure manner from the sensors when a task authorization message is received and authenticated as having been transmitted from a remote master device authorized to communicate in the monitoring system. The task authorization message includes information identifying at least the sensor from which to receive the data. The electronic device is configured to authenticate and encrypt the received data prior to transmitting the received data to the remote master device.

In some implementations the electronic device may be configured to activate from a sleep mode upon receiving the task authorization message. In some implementations electronic device may be configured to transmit the received data in a secure manner to the remote master device. The sensors may be configured to broadcast a sensor identification number. The task authorization information identifying the sensor may include at least a portion of the broadcast sensor identification number.

A further monitoring system is provided in yet another innovative aspect. The system includes a plurality of communication devices configured to communicate in a secure manner in the system. The system includes a plurality of non-system sensors configured to sense information. The non-system sensors are not authorized to communicate securely in the monitoring system. The system further includes an electronic device authorized to communicate in the monitoring system. The electronic device is further configured to receive data from the non-system sensors when a task authorization message is received and authenticated as having been transmitted from a remote master device authorized to communicate in the monitoring system. The task authorization message includes information identifying at least the non-system sensor from which to receive the data. Electronic device is configured to authenticate and encrypt the received data prior to transmitting the received data to the remote master device.

In some implementations electronic device is further configured to be activated from a sleep mode upon receiving the task authorization message. The electronic device may be configured to transmit the received data in a secure manner to the remote master device. The non-system sensors may be configured to broadcast a sensor identification number wherein the task authorization information identifying the non-system sensor includes at least a portion of the broadcast sensor identification number. It may be desirable for the electronic device to be configured to encode context information into a message containing the received data. The electronic device may be configured to transmit the received data message in a secure manner to the remote master device wherein the context information includes data identifying a time and a location from which the data was received.

In a still further innovative aspect, a monitoring system is provided the monitoring system includes a plurality of communication devices authorized to communicate in the monitoring system. The system further includes a plurality of sensors configured to sense information. The sensors are authorized in configured to communicate in the monitoring system. The sensors are further configured to be in a sleep mode until activated by a task authorization message received from a master device authorized to communicate in the monitoring system. The system further includes an electronic master device authorized to communicate in the monitoring system and configured to transmit a task authorization message to the sensors. The task authorization message includes information identifying at least the sensor from which to receive sensed information. The sensors are configured to encode a digital signature and encrypt the sensed information prior to transmitting the sensed information to the electronic master device.

In some implementations the electronic device is further configured to be activated from a sleep mode upon relieving a second task authorization message from a remote master device authorized to communicate in the system. Electronic device may be further configured to transmit the received information in a secure manner to the remote master device. In some implementations the sensors are configured to intermittently broadcast a sensor identification number while in the sleep mode. In such implementations, the task authorization information identifying the sensor may include at least a portion of the broadcast sensor identification number.

In yet another innovative aspect, a monitoring system including a plurality of communication devices that are authorized to communicate in the monitoring system is provided. The system includes a plurality of sensors. The system further includes an electronic device authorized to communicate in the monitoring system. The electronic device is further configured to receive data from the sensors when a task authorization message is received and authenticated as having been transmitted from a remote master device authorized to communicate in the system. The task authorization message includes information identifying at least the sensor from which to receive the data. Electronic device is configured to authenticate and encrypt the received data prior to transmitting the received data to the remote master device via a first communication path. The electronic device is further configured to confirm receipt of the transmitted data by the remote master device.

In some implementations electronic device may transmit the received data to remote master device via a second communication pathway if the electronic device does not confirm receipt of the data by the remote master device. The first comedic occasion pathway may include a satellite network in the second communication pathway may include a local wireless work. In some implementations the first communication pathway may include a local wireless network in the second communication pathway may include a satellite network.

In a further innovative aspect, a monitoring system is provided. The monitoring system includes an environmental sensor configured to detect environmental information associated with an object. The system includes an identification sensor configured to identify the object. The system includes a timing device configured to provide time information including a time of day and the date. The system further includes a location sensor configured to receive location information. The system also includes an electronic device configured to receive data from the environmental sensor, the identification sensor, the timing device, and the location sensor. The electronic device is further configured to transmit the received data such that the timing information, object identification information, location information, and the environmental information can be linked together. The linked data may be transmitted to a remote device in a secure manner.

In some implementations the object is a person any identification sensor is a biometric sensor configured to receive biometric information of the person. The identification sensor may be a camera configured to capture images of the object. The object may be located in a room. The location sensor may include a GPS sensor. The timing device may be configured to receive a system time. The environmental sensor may be implemented as a chemical detector, radiological detector, or the like.

In a further innovative aspect, a shipping container monitoring system is provided. The system includes a plurality of sensors configured to detect environmental information about an area inside or outside the container. The system includes a timing device configured to provide time information including a time of day. The system includes a location sensor configured to receive location information. The system further includes an electronic device configured to receive data from the plurality of sensors, the timing device, and the location sensor. The electronic device is configured to transmit the received data such that the timing information, the location information, and the environmental information are synchronized. The synchronized data is encrypted and transmitted to a remote device in a secure manner.

The plurality of sensors may include an image capture device configured to capture images of the inside of the container. The plurality of sensors may include an image capture device configured to capture images of the container. The location sensor may include a GPS sensor. The timing device may be configured to receive a system time. In some implementations, the system may include a plurality of antenna wherein the electronic device is further configured to transmit the synchronize data via one of the antenna. In some implementations, the plurality of sensors are configured to be in a sleep state until a task authorization message is received and authenticated as having been transmitted from the remote device. The system may include a bus comprising a plurality of connectors. The plurality of sensors may be configured to plug into the connectors of the bus and to communicate with the electronic device with a communications protocol.

A portable monitoring system is described in a further innovative aspect. The system includes a tempest constructed housing to provide shielding for enclosed devices. The housing encloses an environmental sensor configured to detect environmental information. The housing encloses a timing device configured to provide time information including a time of day and a date. The housing encloses a location sensor configured to receive location information. The housing encloses a processor configured to receive data from the environmental sensor, the timing device, and the location sensor. The electronic device is configured to transmit the received data such that the timing information, object identification information, the location information, and the environmental information are synchronized. The synchronize data is transmitted to a remote device in a secure manner.

In some implementations at least one of the sensors includes an image capture device configured to capture image data. At least one of the sensors may include an audio capture device configured to capture audio information. The location sensor may include a GPS sensor. The timing device may be configured to receive a system time. The system may include a plurality of antenna at least one of which may be used by the electronic device to transmit the synchronize data.

The system may include a plurality of additional sensors. The system may also include a remote device configured to transmit secure instructions. The system may further include an electronic device configured to receive data from the sensors. The electronic device may be configured to receive the secure instructions from the remote device. The secure instructions may direct the electronic device to receive data from one or more of the sensors. In some implementations, the electronic device may be configured to authenticate the received secure instructions.

In a further innovative aspect, another system is provided. The system includes a plurality of sensors. The system includes a remote device configured to transmit encrypted monitoring instructions. The system further includes an electronic device configured to receive data from the sensors. The electronic device is further configured to receive and decrypt the monitoring instructions from the remote device via a network. The monitoring instructions include a monitoring schedule for one or more of the plurality of sensors. The electronic device is configured to receive data from the sensors in accordance with the received monitoring schedule.

In some implementations the monitoring schedule defines the frequency that at least one of the sensors will transmit data to the electronic device. The monitoring schedule may define a sampling frequency for at least one of the sensors. The monitoring instructions and also define a plurality of alarm conditions. The electronic device may be configured to authenticate the received monitoring instructions.

And yet another innovative aspect, yet another system is provided. The system includes a plurality of sensors. The system includes a remote device configured to transmit encrypted monitoring instructions. The encrypted monitoring instructions may include a tolerance range for at least one of the sensors. The system further includes an electronic device configured to receive sensor data from the sensors. The electronic device is further configured to receive, authenticate, and decrypt the encrypted monitoring instructions from the remote device. The electronic device is further configured to compare the sensor data to the received tolerance range.

A further system is provided in yet another innovative aspect. The system includes a plurality of sensors. The system includes a remote device configured to transmit encrypted monitoring instructions. Encrypted monitoring instructions identify one or more of the plurality of sensors, sensing schedule, and one or more alarm thresholds. The system also includes an electronic device configured to receive sensor data from the sensors in accordance with the sensing schedule. The electronic device is also configured to receive and decrypt the monitoring instructions. The electronic device is further configured to identify alarm conditions based on the identified alarm thresholds and sent data from the sensors.

While the above detailed description has shown, described, and pointed out novel features of the invention as applied to various embodiments, it will be understood that various omissions, substitutions, and changes in the form and details of the device or process illustrated may be made by those skilled in the art without departing from the spirit of the invention. As will be recognized, the present invention may be embodied within a form that does not provide all of the features and benefits set forth herein, as some features may be used or practiced separately from others.

What is claimed is:

1. A surveillance system comprising:
an electronic device configured to receive environmental and spatial data from a plurality of sensors, the electronic device further configured to receive diagnostic test instructions from a remote device, to conduct one or more diagnostic tests on the electronic device and the data received from the sensors, and to transmit information based on the received environmental and spatial data and results of the one or more diagnostic tests to the remote device.

2. The system of claim 1, wherein the electronic device is further configured to receive monitoring instructions to process the received environmental and spatial data and to recognize a sensor dynamically added to the plurality of sensors.

3. The system of claim 1, further comprising the plurality of sensors, wherein one or more of the sensors is enclosed within a tamper and eavesdrop-proof enclosure.

4. The system of claim 2, wherein the monitoring instructions are contained in a script message, the script message comprising a header containing one or more identification fields and a body containing one or more tasks to be performed.

5. The system of claim 1, wherein received instructions are encrypted and the electronic device is further configured to decrypt the encrypted instructions.

6. The system of claim 2, wherein the electronic device is further configured to authenticate the remote device prior to using the monitoring instructions to process the received environmental and spatial data or the diagnostic test instructions.

7. The system of claim 1, wherein the electronic device is further configured to compare at least a portion of the received environmental and spatial data to a range of acceptable values and to transmit the information to the remote device.

8. The system of claim 1, wherein the electronic device is further configured to conduct a self-diagnosis prior to transmitting the information to the remote device.

9. The system of claim 2, wherein the plurality of sensors are further configured to sense information; and
the electronic device is further configured to determine an alarm condition based upon the received environmental and spatial data, and wherein the electronic device compares the received environmental and spatial data to a range of acceptable values and conducts a self-diagnosis prior to transmitting the alarm condition to the remote device.

10. The system of claim 2, wherein the plurality of sensors are further configured to sense information; and
wherein the electronic device is further configured to determine an alarm condition based upon the received environmental and spatial data, and wherein the electronic device determines a state of reliability of the sensor that the data is received from, and conducts a self-diagnosis based on the state of reliability prior to transmitting the alarm condition to a remote device.

11. The system of claim 1 further comprising:
a plurality of communication devices that are authorized to communicate in the system,
wherein the plurality of sensors are authorized and configured to communicate in the system,
wherein the electronic device is authorized to communicate in the system and configured to receive data in a secure manner from the sensors when a task authorization message is received and authenticated as having been transmitted from a remote master device authorized to communicate in the system, wherein the task authorization message comprises information identifying at least the sensor from which to receive the data, and
wherein the electronic device authenticates and encrypts the received data prior to transmitting the received data to the remote master device.

12. The system of claim 2 further comprising:
a plurality of communication devices configured to communicate in a secure manner in the system; and
a plurality of non-system sensors configured to sense information, wherein the non-system sensors are not authorized to communicate securely in the system,
wherein the electronic device is authorized to communicate in the system and configured to receive data from the non-system sensors when a task authorization message is received and authenticated as having been transmitted from a remote master device authorized to communicate in the system,
wherein the task authorization message comprises information identifying at least the non-system sensor from which to receive the data, and
wherein the electronic device authenticates and encrypts the received data prior to transmitting the received data to the remote master device.

13. The system of claim 1 further comprising:
a plurality of communication devices authorized to communicate in the system; and an electronic master device authorized to communicate in the system and configured to transmit a task authorization message to the sensors, wherein the task authorization message comprises information identifying at least the sensor from which to receive sensed information, and wherein the sensor encodes a digital signature and encrypts the sensed information prior to transmitting the sensed information to the electronic master device.

14. The system of claim 1 further comprising:

a plurality of communication devices authorized to communicate in the system, wherein the electronic device is authorized to communicate in the system via the plurality of communication devices and configured to receive data from the sensors when a task authorization message is received and authenticated as having been transmitted from a remote master device authorized to communicate in the system, wherein the task authorization message comprises information identifying at least the sensor from which to receive the data, wherein the electronic device authenticates and encrypts the received data prior to transmitting the received data to the remote master device via a first communication pathway, and wherein the electronic device is configured to confirm receipt of the transmitted data by the remote master device.

15. The system of claim 2 wherein the plurality of sensors comprise:

an environmental sensor configured to detect environmental information associated with an object;

an identification sensor configured to identify the object;

a timing device configured to provide time information comprising a time of day and a date; and a location sensor configured to receive location information, wherein the electronic device configured to receive data from the environmental sensor, the identification sensor, the timing device, and the location sensor, wherein the electronic device is further configured to transmit the received data such that the timing information, object identification information, the location information, and the environmental information can be linked together to form linked data, and wherein the linked data is transmitted to the remote device in a secure manner.

16. The system of claim 2, wherein the plurality of sensors comprise:

a shipping container sensor configured to detect environmental information about an area inside or outside the container;

a timing device configured to provide time information comprising a time of day; and a location sensor configured to receive location information, wherein the electronic device is configured to receive data from the plurality of sensors, the timing device and the location sensor, wherein the electronic device is further configured to transmit the received data such that the timing information, the location information, and the environmental information are synchronized to form synchronized data, and wherein the synchronized data is encrypted and transmitted to the remote device in a secure manner.

17. The system of claim 2, further comprising:

a tempest constructed housing to provide shielding for at least one of the plurality of sensors and the electric device, the housing enclosing:

an environmental sensor included in the plurality of sensors, the environmental sensor configured to detect environmental information;

a timing device configured to provide time information comprising a time of day and a date;

a location sensor included in the plurality of sensors, the location sensor configured to receive location information; and a processor configured to receive data from the environmental sensor, the timing device, and the location sensor, wherein the electronic device is further configured to transmit the received data such that the timing information, object identification information, the location information, and the environmental information are synchronized to form synchronized data, and wherein the synchronized data is transmitted to the remote device in a secure manner.

18. The system of claim 1, wherein:

the remote device is configured to transmit secure instructions, wherein the electronic device is further configured to receive the secure instructions from the remote device, and wherein the secure instructions direct the electronic device to receive data from one or more of the plurality of sensors.

19. The system of claim 1, wherein:

the remote device configured to transmit encrypted monitoring instructions, wherein the electronic device is further configured to receive and decrypt the monitoring instructions from the remote device via a network, the monitoring instructions including a monitoring schedule for one or more of the plurality of sensors, the electronic device configured to receive data from the sensors in accordance with the monitoring schedule.

20. The system of claim 19, wherein the encrypted monitoring instructions comprise a tolerance range for at least one of the sensors, and wherein the electronic device is configured to compare the sensor data to the tolerance range.

* * * * *